(12) United States Patent
Kurata et al.

(10) Patent No.: US 10,987,976 B2
(45) Date of Patent: Apr. 27, 2021

(54) PNEUMATIC TIRE

(71) Applicant: BRIDGESTONE CORPORATION, Tokyo (JP)

(72) Inventors: Takayuki Kurata, Tokyo (JP); Shinsaku Katayama, Tokyo (JP); Masakazu Amano, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 655 days.

(21) Appl. No.: 15/577,770

(22) PCT Filed: Apr. 19, 2016

(86) PCT No.: PCT/JP2016/062437
§ 371 (c)(1),
(2) Date: Nov. 29, 2017

(87) PCT Pub. No.: WO2016/203837
PCT Pub. Date: Dec. 22, 2016

(65) Prior Publication Data
US 2018/0126794 A1 May 10, 2018

(30) Foreign Application Priority Data
Jun. 15, 2015 (JP) .............................. JP2015-120368

(51) Int. Cl.
*B60C 11/13* (2006.01)
*B60C 11/12* (2006.01)
(Continued)

(52) U.S. Cl.
CPC ............ *B60C 11/1353* (2013.01); *B60C 3/04* (2013.01); *B60C 11/0083* (2013.01);
(Continued)

(58) Field of Classification Search
CPC ... B60C 3/04; B60C 11/0311; B60C 11/0083; B60C 11/0302; B60C 11/1307;
(Continued)

(56) References Cited

U.S. PATENT DOCUMENTS 5,643,373 A * 7/1997 Iwasaki ............... B60C 11/0083
152/209.15
2012/0132334 A1 5/2012 Nomura
(Continued)

FOREIGN PATENT DOCUMENTS

| CN | 104136241 A | 11/2014 | |
| DE | 19604130 A1 * | 8/1997 | ......... B60C 11/0309 |

(Continued)

OTHER PUBLICATIONS

Machine translation of DE-19604130 (no date).*
(Continued)

*Primary Examiner* — Steven D Maki
*Assistant Examiner* — Philip N Schwartz
(74) *Attorney, Agent, or Firm* — Solaris Intellectual Property Group, PLLC

(57) ABSTRACT

By forming a ground contact edge side of lug grooves such that the groove depth becomes shallower in groove depth from the tire equatorial plane side toward the ground contact edge, and by setting an average angle of inclination formed between a tread face and a groove bottom to be not more than 5°, water expulsion is performed smoothly in the vicinity of the ground contact edge while securing the rigidity of land portions in the vicinity of the ground contact edge. This enables a high degree of both wet performance and dry performance to be achieved.

18 Claims, 11 Drawing Sheets

(51) Int. Cl.
    *B60C 11/03* (2006.01)
    *B60C 11/00* (2006.01)
    *B60C 11/11* (2006.01)
    *B60C 3/04* (2006.01)

(52) U.S. Cl.
    CPC ....... *B60C 11/0302* (2013.01); *B60C 11/0311* (2013.01); *B60C 11/0316* (2013.01); *B60C 11/11* (2013.01); *B60C 11/124* (2013.01); *B60C 11/1204* (2013.01); *B60C 11/1236* (2013.01); *B60C 11/1259* (2013.01); *B60C 11/1263* (2013.01); *B60C 11/1272* (2013.01); *B60C 11/1307* (2013.01); *B60C 11/0309* (2013.01); *B60C 2011/0313* (2013.01); *B60C 2011/0334* (2013.01); *B60C 2011/0369* (2013.01); *B60C 2011/1213* (2013.01)

(58) Field of Classification Search
    CPC ... B60C 11/11; B60C 11/1236; B60C 11/124; B60C 11/1259; B60C 11/1353; B60C 11/1272; B60C 11/0316; B60C 11/1263; B60C 11/1204; B60C 11/0309; B60C 2011/0334; B60C 2011/0369; B60C 2011/1213; B60C 2011/0313
    See application file for complete search history.

(56) References Cited

U.S. PATENT DOCUMENTS

| | | |
|---|---|---|
| 2013/0020001 A1 | 1/2013 | Nishi |
| 2015/0007918 A1 | 1/2015 | Hironaka et al. |

FOREIGN PATENT DOCUMENTS

| | | | |
|---|---|---|---|
| DE | 19604130 A1 | 8/1997 | |
| EP | 0333397 A2 | 9/1989 | |
| EP | 0678403 A1 | 10/1995 | |
| EP | 0890456 A2 | 1/1999 | |
| EP | 2610084 A1 | 7/2013 | |
| EP | 2857225 A1 | 4/2015 | |
| JP | 63159107 A * | 7/1988 | ............ B60C 11/01 |
| JP | 03193507 A * | 8/1991 | ............ B60C 11/11 |
| JP | H03-193507 A | 8/1991 | |
| JP | H7-195911 A | 8/1995 | |
| JP | H07-276915 A | 10/1995 | |
| JP | 2006-44575 A | 2/2006 | |
| JP | 2006-273258 A | 10/2006 | |
| JP | 3924049 B2 | 6/2007 | |
| JP | 2008-308013 A | 12/2008 | |
| JP | 2011-143896 A | 7/2011 | |
| JP | 2011-225084 A | 11/2011 | |
| JP | 2012-96776 A | 5/2012 | |
| JP | 2012-116306 A | 6/2012 | |
| JP | 2014-205489 A | 10/2014 | |

OTHER PUBLICATIONS

Machine translation of JP03-193507 (no date).*
Machine translation of JP63-159107 (no date).*
International Search Report issued in International Application No. PCT/JP2016/062437 dated Jul. 19, 2016.
Extended European Search Report dated Apr. 19, 2018 issued in corresponding EP Patent Application No. 16811312.4.
Search Report of the Chinese office action dated Dec. 24, 2018, from the SIPO in a Chinese patent application corresponding to the instant patent application.

* cited by examiner

PNEUMATIC TIRE

TECHNICAL FIELD

The present invention relates to a pneumatic tire.

BACKGROUND ART

Conventional pneumatic tires are known in which lug grooves are formed in a tread in order to obtain water expelling performance (see, for example, 1: Japanese National-Phase Publication No. 2008-308013).

SUMMARY OF INVENTION

Technical Problem

Hitherto, pneumatic tires have demanded a high degree of both wet performance, achieved through the water expelling performance of grooves, and dry performance, achieved through block rigidity.

There is a need for a groove depth of lug grooves to be deep in order to improve the water expelling performance of the lug grooves, and a need for a groove depth of lug grooves to be shallow in order to raise block rigidity.

However, although simply setting lug grooves with a shallow groove depth in the vicinity of ground contact edges of a tread in order to secure the rigidity of shoulder-side land portions does raise the rigidity of the shoulder-side land portions, this is detrimental to water expelling performance. Moreover, if projections are provided at groove bottoms of the lug grooves as in the cited Patent Document, resistance arises when water flows through, which could result in turbulent flow within the grooves, such that water does not flow smoothly.

In consideration of the above circumstances, an object of an embodiment of the present invention is to provide a pneumatic tire capable of achieving a high degree of both wet performance and dry performance.

Solution to Problem

A pneumatic tire according to a first aspect includes a tread that contacts a road surface and plural lug grooves that are provided at the tread, that extend from a tire width direction center side of the tread toward a ground contact edge of the tread, and that partition a land portion. When viewing a cross-section of each of the lug grooves along a groove length direction, in a state in which the tire is mounted to an applicable rim and inflated to a maximum air pressure corresponding to a tire standard maximum load capacity while applied with a load of 100% of the maximum load capacity in a state in which a tire rotation axis is, with respect to a horizontal and flat road surface, parallel to the road surface, each of the lug grooves includes a groove bottom formed at an incline with respect to a tread face of the tread contacting the road surface such that a groove depth at a ground contact edge side of the lug grooves becomes shallower in depth on progression from a tire equatorial plane side toward the ground contact edge. Moreover, an average angle of inclination $\theta 1$ formed between the tread face and the groove bottom of the lug grooves from an intersection point P1 to an intersection point P3 is set to be no more than 5°. Wherein: P1 is an intersection point between the groove bottom of the lug grooves and an imaginary line passing through the ground contact edge and extending in a direction at a right angle to the tread face, P3 is an intersection point between the groove bottom of the lug grooves and an imaginary line passing through a ⅓ point P2 on the tread face and extending in a direction at a right angle to the tread face, and P2 is ⅓ of the distance of a tread half-width from the ground contact edge toward the tire equatorial plane side.

In the pneumatic tire according to the first aspect, the tread is provided with the lug grooves formed such that the groove depth at the ground contact edge side becomes shallower in depth on progression from the tire equatorial plane side toward the ground contact edge. Due to the average angle of inclination $\theta 1$ of the groove bottom at the ground contact edge side of the lug groove being set to be no more than 5°, when traveling on a wet road surface, this enables water that is taken into the lug groove and that flows from the tire width direction center side toward the ground contact edge of the tread to flow smoothly in the vicinity of the ground contact edge, to be expelled toward the outside of the ground contact plane while securing the rigidity of the land portion in the vicinity of the ground contact edge.

A pneumatic tire according to a second aspect includes a tread that contacts a road surface, and plural lug grooves. The lug grooves are provided at the tread, extend from a tire width direction center side of the tread toward a ground contact edge of the tread, and partition a land portion. When viewing a cross-section of each of the lug grooves taken along a groove length direction, in a state in which the tire is mounted to an applicable rim and inflated to a maximum air pressure corresponding to a tire standard maximum load capacity while in a non-loaded state, each of the lug grooves has a groove bottom formed at an incline with respect to a tread face of the tread, such that a groove depth at a ground contact edge side of the lug grooves becomes shallower in depth on progression from a tire equatorial plane side toward the ground contact edge. Moreover, an average angle of inclination $\theta 2$ formed between the tread face between the ground contact edge and a ⅓ point P2, and the groove bottom between an intersection point P1 and an intersection point P3, is set to be no more than 5°. Wherein: P1 is an intersection point between the groove bottom of the lug grooves and an imaginary line passing through the ground contact edge and extending in a direction at a right angle to the tread face, P3 is an intersection point between the groove bottom of the lug grooves and an imaginary line passing through the ⅓ point P2 on the tread face and extending in a direction at a right angle to the tread face, and P2 is ⅓ of the distance of a tread half-width from the ground contact edge toward a tire equatorial plane side.

In the pneumatic tire according to the second aspect, the tread is provided with the lug grooves formed such that the groove depth at the ground contact edge side of the lug groove becomes shallower in depth on progression from the tire equatorial plane side toward the ground contact edge. Due to the average angle of inclination $\theta 2$ of the groove bottom at the ground contact edge side of the lug groove being set to be no more than 5°, when traveling on a wet road surface, this enables water that is taken into the lug groove and that flows from the tire width direction center side toward the ground contact edge of the tread to flow smoothly in the vicinity of the ground contact edge and to be expelled toward the outside of the ground contact plane.

A pneumatic tire according to a third aspect is the pneumatic tire according to the first aspect or the second aspect, wherein a flat portion having a constant groove depth from the ground contact edge toward a tire width direction inner side is provided at the groove bottoms.

In the pneumatic tire according to the third aspect, due to providing the groove bottom of the lug groove with the flat portion having a constant groove depth from the ground contact edge toward a tire width direction inner side, this enables water to flow smoothly in the flat portion.

A pneumatic tire according to a fourth aspect is the pneumatic tire of any one of the first aspect to the third aspect, wherein plural sipes are formed in the land portion including the ground contact edge, the plural sipes being formed so as to extend from a tire width direction inner side end of the land portion toward a tire width direction outer side and to traverse the ground contact edge, and at least half of the sipes out of the plural sipes are provided with a first raised-bottom portion having a height of from 2 mm to 4 mm within a range from the ground contact edge to 20 mm toward the tire width direction inner side.

According to the pneumatic tire according to the fourth aspect, the plural sipes are formed in the land portion that includes the ground contact edge. Due to at least half of the sipes out of the plural sipes being provided with the first raised-bottom portion having a height of from 2 mm to 4 mm within a range from the ground contact edge to 20 mm toward the tire width direction inner side, this enables rigidity on the ground contact edge side of the land portion to be secured.

In the pneumatic tire according to the fourth aspect, sipes that are provided with the first raised-bottom portion and sipes that are not provided with the first raised-bottom portion are disposed alternately, enabling a configuration such that the first raised-bottom portions are not adjacent to each other in the tire circumferential direction for mutually adjacent sipes. This enables the effect of improved rigidity of the land portions due to the first raised-bottom portions to be moderated between mutually adjacent sipes compared to cases in which the first raised-bottom portions are adjacent to each other in the tire circumferential direction.

Moreover, in the pneumatic tire according to the fourth aspect, in cases in which sipes provided with the first raised-bottom portions are adjacent to each other, sipes provided with first raised-bottom portions having relatively low heights and sipes provided with first raised-bottom portions having relatively high heights are disposed alternately. This enables the first raised-bottom portions having low heights and the first raised-bottom portions having high heights are disposed alternately to be disposed alternately to each other along the tire circumferential direction. This enables the effect of improved rigidity of the land portions due to the first raised-bottom portions to be moderated between mutually adjacent sipes compared to cases in which the first raised-bottom portion having high heights are adjacent to each other in the tire circumferential direction.

A pneumatic tire according to a fifth aspect is the pneumatic tire of any one of the first aspect to the fourth aspect, wherein the land portion partitioned by the plural lug grooves is further partitioned into plural blocks in a tire width direction by plural circumferential direction grooves extending in a direction intersecting the lug grooves. Plural sipes are formed at blocks among the plurality of blocks that include the ground contact edge. At least half of the plurality of sipes are provided with a second raised-bottom portion having a height of from 2 mm to 5 mm within a range spanning from a tire width direction inner side end of the blocks to a position 40% of the distance from the tire width direction inner side end toward the ground contact edge of the block.

In the pneumatic tire according to the fifth aspect, the plural sipes are formed at the blocks that include the ground contact edge. Du to at least half of the sipes out of the plural sipes being provided with a second raised-bottom portion having a height of from 2 mm to 5 mm within a range spanning from a tire width direction inner side end of the block toward the ground contact edge side as far as a position 40% of the distance from the tire width direction inner side end to the ground contact edge, this enables rigidity on the tire width direction inner side of the blocks to be secured.

In the pneumatic tire according to the fifth aspect, sipes that are provided with the second raised-bottom portion and sipes that are not provided with the second raised-bottom portion are disposed alternately, enabling a configuration such that the second raised-bottom portions are not adjacent each other in the tire circumferential direction for mutually adjacent sipes. This enables the effect of improved rigidity of the land portions due to the second raised-bottom portions to be moderated between adjacent sipes compared to cases in which the second raised-bottom portion are configured adjacent to each other in the tire circumferential direction.

Moreover, in the pneumatic tire according to the fifth aspect, in cases in which sipes provided with the second raised-bottom portions are adjacent to each other, sipes provided with second raised-bottom portions having relatively low heights and sipes provided with second raised-bottom portions having relatively high heights are disposed alternately. This enables the second raised-bottom portions having high heights and the second raised-bottom portions having low heights to be disposed alternately to each other along the tire circumferential direction. This enables the effect of improved rigidity of the land portions due to the second raised-bottom portions to be moderated between adjacent sipes compared to cases in which the second raised-bottom portions having high heights are adjacent to each other in the tire circumferential direction.

An angle of inclination of the lug groove with respect to the tire width direction may be set so as to be smaller on the ground contact edge side of the tread than on the tire width direction center side of the tread.

Configuring the angle of inclination of the lug groove with respect to the tire width direction so as to be smaller on the ground contact edge side of the tread than on the tire width direction center side enables water expelling performance to be improved compared to cases in which the angle of inclination of the lug groove with respect to the tire width direction is constant.

A change in the angle of inclination of the lug groove with respect to the tire width direction may be made larger on the ground contact edge side of the tread than on the tire width direction center side of the tread.

Making the change in the angle of inclination of the lug groove with respect to the tire width direction larger on the ground contact edge side of the tread than on the tire width direction center side enables water expelling performance to be further improved.

A center circumferential direction groove disposed on the tire equatorial plane and extending along the tire circumferential direction may be provided at the tread, and the lug grooves may extend from the center circumferential direction groove to the ground contact edge of the tread.

Since the center circumferential direction groove extends along the tire circumferential direction, water taken into the groove can flow efficiently in the tire circumferential direction and be efficiently expelled toward the tire outside. Moreover, the center circumferential direction groove disposed on the tire equatorial plane can efficiently expel water in the vicinity of the center in the ground contact plane.

Moreover, since the lug grooves extend from the center circumferential direction groove to the ground contact edge of the tread, some of the water taken into the center circumferential direction groove can be expelled toward the ground contact edge outside of the tread via the lug grooves. This enables water expelling efficiency to be raised.

Herein, the "ground contact edge" of the present invention refers to a tire width direction outermost position of a portion of a tread face that contacts the road surface (contact patch shape) when a pneumatic tire is mounted to a standard rim, as defined in the JATMA YEAR BOOK (Japan Automobile Tire Manufacturers Association standards), inflated to an internal pressure of 100% the air pressure (maximum air pressure) corresponding to the maximum load capacity (load shown in bold in the internal pressure-load capacity correspondence table) for the applicable JATMA YEAR BOOK size/ply rating, when the maximum load capacity is applied thereto. Note that in cases in which TRA standards or ETRTO standards apply in the location of use or manufacturing location, then the respective standards are adhered to.

Advantageous Effects of Invention

The pneumatic tire according to the first aspect is capable of achieving a high degree of both wet performance and dry performance.

DESCRIPTION OF EMBODIMENTS

First Exemplary Embodiment

Figure 1:
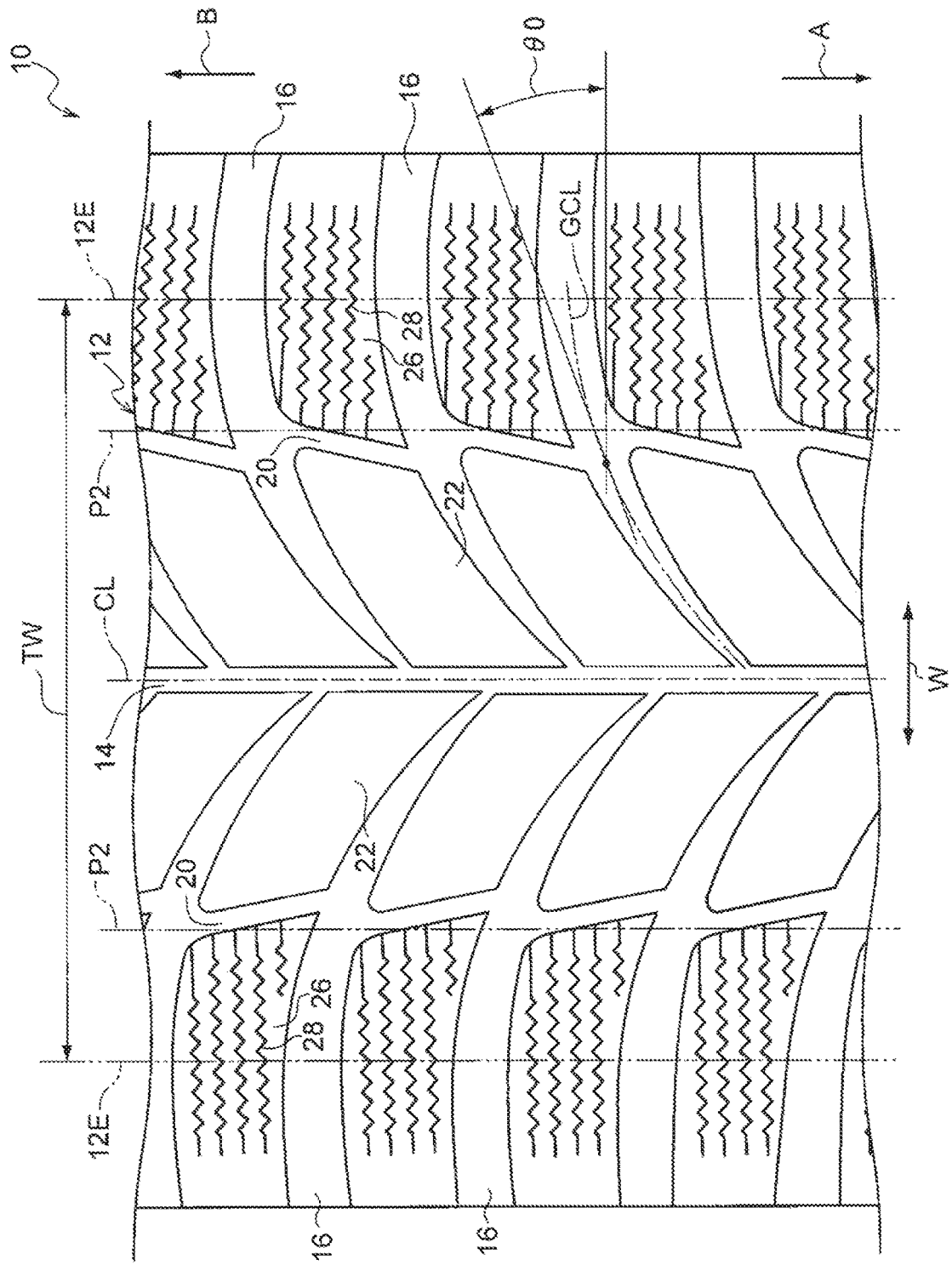
FIG. 1 is a plan view illustrating a tread of a pneumatic tire according to a first exemplary embodiment of the present invention.

Explanation follows regarding a pneumatic tire 10 according to a first exemplary embodiment of the present invention, with reference to the drawings. Note that the pneumatic tire 10 of the present exemplary embodiment is that of a passenger vehicle. The internal structure of the pneumatic tire 10 is similar to that of a conventional pneumatic tire, and so explanation thereof is omitted. In the drawings hereafter, the arrow A direction, the arrow B direction, and the arrow W direction respectively indicate the tire rotation direction (tread-in side), the opposite direction to the tire rotation direction (kick-off side), and the tire width direction.

As illustrated in FIG. 1, a tread 12 of the pneumatic tire 10 is formed with a center circumferential direction groove 14 extending around the tire circumferential direction on a tire equatorial plane CL, and plural lug grooves 16 extending from the center circumferential direction groove 14 toward ground contact edges 12E. Moreover, on the tread 12, shoulder-side circumferential direction grooves 20 are formed on both tire width direction sides of the center circumferential direction groove 14 so as to couple together one lug groove 16 and another lug groove 16 that are adjacent to each other in the tire circumferential direction. The center circumferential direction groove 14, the lug grooves 16, and the shoulder-side circumferential direction grooves 20 are main grooves of the tread 12.

Each shoulder-side circumferential direction groove 20 of the present exemplary embodiment is inclined with respect to the tire circumferential direction such that an end portion on the tire rotation direction side (arrow A direction side) is positioned further toward the tire width direction inner side than an end portion on the opposite direction side to the tire rotation direction side (arrow B direction side).

On the tread 12, center-side blocks 22 are partitioned by the center circumferential direction groove 14, the lug grooves 16, and the shoulder-side circumferential direction grooves 20, and shoulder-side blocks 26 are partitioned by the shoulder-side circumferential direction grooves 20 and the lug grooves 16.

On each center-side block 22 and shoulder-side block 26, plural sipes 28 are formed extending in zigzags from a tire width direction inner side end portion toward the tire width direction outer side. The depth of the sipes 28 of the present exemplary embodiment is set to 50% or greater of the groove depth of the lug grooves 16 (however, their maximum depth is no greater than the groove depth of the lug grooves 16).

Details Regarding the Lug Grooves

Each lug groove 16 of the present exemplary embodiment extends inclined from the center circumferential direction groove 14 toward the ground contact edge 12E. An angle of inclination θ0 of the lug groove 16 with respect to the tire width direction gradually decreases on progression toward the ground contact edge 12E, and a groove width of the lug groove 16 gradually increases on progression toward the ground contact edge 12E. Further, the degree of change of the angle of inclination θ0 of the lug groove 16 with respect to the tire width direction is greater on the ground contact edge 12E side than on the tire width direction center side. Note that as illustrated in FIG. 1, the angle of inclination θ0 of the lug groove 16 with respect to the tire width direction is an angle of inclination of a tangent to a groove width center line GCL of the lug groove 16 with respect to the tire width direction.

Note that the lug groove 16 may be formed parallel to the tire width direction, or may extend inclined at a constant angle with respect to the tire width direction. Further, the groove width of the lug groove 16 may be constant from the center circumferential direction groove 14 to the ground contact edge 12E.

Cross-Section Profile of Lug Groove Along Length Direction

Figure 2:
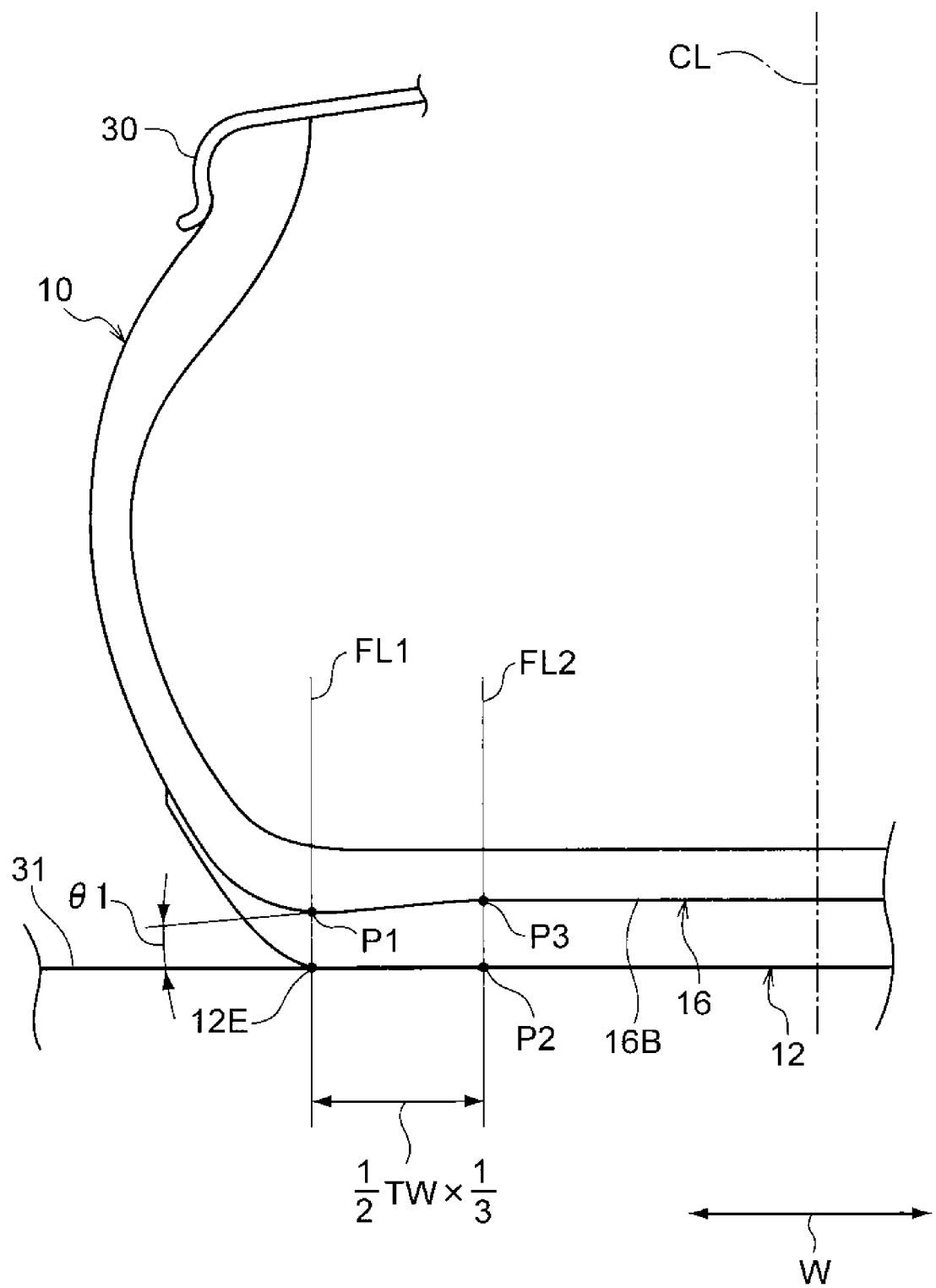
FIG. 2 is a cross-section taken along a tire rotation axis and illustrating one side of a pneumatic tire mounted to a rim and in contact with a road surface.

As illustrated in FIG. 2, when viewing the cross-section of the lug groove 16 taken along its groove length direction (groove width center line GCL) in a state in which the pneumatic tire 10 of the present exemplary embodiment is mounted to an applicable rim 30, and inflated to the maximum air pressure corresponding to the tire standard (JATMA in the present exemplary embodiment) maximum load (maximum load capacity) while applied with a load of 100% of the maximum load in a state in which and the tire rotation axis is, with respect to a horizontal and flat road surface 31, parallel to the road surface, a groove bottom 16B is inclined with respect to a tread face 12A contacting the road surface 31 such that the groove depth in the vicinity of the ground contact edge 12E of the lug groove 16 becomes gradually shallower in groove depth on progression from the tire equatorial plane CL side toward the ground contact edge 12E. On the tire equatorial plane CL side, the groove bottom 16B is formed with a constant groove depth parallel with respect to the tread face 12A contacting the road surface 31. Note that in FIG. 2, the center circumferential direction groove 14 and the shoulder-side circumferential direction grooves 20 are omitted from illustration.

With regard to the lug groove 16, the groove bottom 16B of the lug groove 16 from an intersection point P1 to an intersection point P3 is set such that an average angle of inclination θ1 with respect to the tread face 12A contacting the road surface 31 is no more than 5°, wherein P1 is an intersection point of an imaginary line FL1 passing through the ground contact edge 12E and extending in a direction at a right angle to the tread face 12A contacting the road surface 31 with the groove bottom 16B (at a groove width center) of the lug groove 16, and P3 is an intersection point of an imaginary line FL2 passing through a ⅓ point P2 on the tread face 12A ⅓ of the distance of a tread half-width ½ TW from the ground contact edge 12E toward the tire equatorial plane CL side and extending in a direction at a right angle to the tread face 12A contacting the road surface 31 with the groove bottom 16B of the lug groove 16. Note that the lug groove 16 has a constant groove depth from the ⅓ point P2 across to the tire equatorial plane CL end portion thereof.

Note that with regard to the groove depth of the lug groove 16, there is no increase in the groove depth of the lug groove 16 from the intersection point P3 to the intersection point P1, since this would decrease the rigidity in the vicinity of the ground contact edge 12E of the tread 12. Note that "rigidity" in the present exemplary embodiment refers to compression rigidity.

Further, the groove depth of the lug groove 16 at the ground contact edge 12E is the same depth or shallower than at the end portion on the tire equatorial plane CL side. However, the groove depth at the ground contact edge 12E is preferably within a range of 50% to 100% of the maximum groove depth on the tire equatorial plane CL side. When the groove depth at the ground contact edge 12E is less than 50% of the maximum groove depth on the tire equatorial plane CL side, the groove depth of the lug groove 16 is too shallow, and water expelling performance decreases. On the other hand, when the groove depth at the ground contact edge 12E is over 100%, the groove depth of the lug groove 16 is too deep, and there is concern regarding block rigidity in the vicinity of the ground contact edge 12E decreasing.

Note that the cross-section profile of the lug groove 16 taken along its groove length direction is explained based on FIG. 2 for a state in which the pneumatic tire 10 is applied with a load and is contacting the road surface; however, explanation follows regarding a case in which the pneumatic tire 10 is in a non-loaded state.

Figure 3:
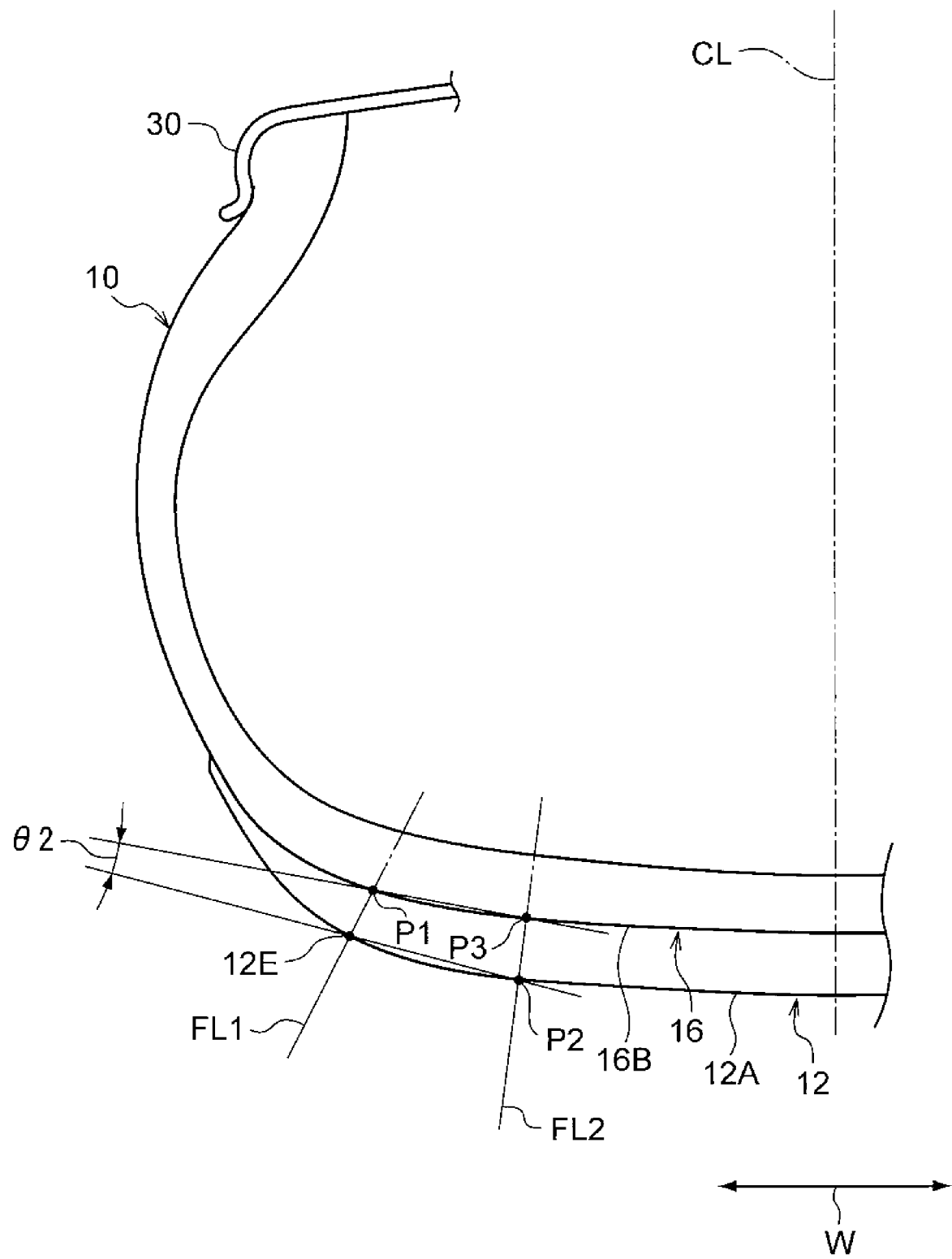
FIG. 3 is a cross-section taken along a tire rotation axis and illustrating one side of a pneumatic tire mounted to a rim and in a non-loaded state.

FIG. 3 illustrates a cross-section of the lug groove 16 taken along its groove length direction when the pneumatic tire 10 of the present exemplary embodiment is mounted to the applicable rim 30, inflated to the maximum air pressure corresponding to the maximum load (maximum load capacity) in the tire standard (JATMA in the present exemplary embodiment) while not applied with a load. As illustrated in FIG. 3, in the vicinity of the ground contact edge 12E, the groove depth of the lug groove 16 becomes gradually shallower in groove depth on progression from the tire equatorial plane CL side toward the ground contact edge 12E, and on the tire equatorial plane CL side, the groove depth is constant. Note that in FIG. 3, the center circumferential direction groove 14 and the shoulder-side circumferential direction grooves 20 are omitted from illustration.

With regard to the lug groove 16, an average angle of inclination θ2 between the groove bottom 16B between an intersection point P1 and the intersection point P3, and the tread face 12A between the ground contact edge 12E and the ⅓ point P2, is set to no more than 5°, wherein the intersection point between the imaginary line FL1 passing through the ground contact edge 12E and extending in a direction at a right angle to the tread face 12A with the groove bottom 16B (at the groove width center) of the lug groove 16 is P1, and the intersection point between the imaginary line FL2 passing through the ⅓ point P2 on the tread face 12A ⅓ of the distance of the tread half-width ½ TW from the ground contact edge 12E toward the tire equatorial plane CL side and extending in a direction at a right angle to the tread face 12A with the groove bottom 16B of the lug groove 16 is P3.

Figure 4:
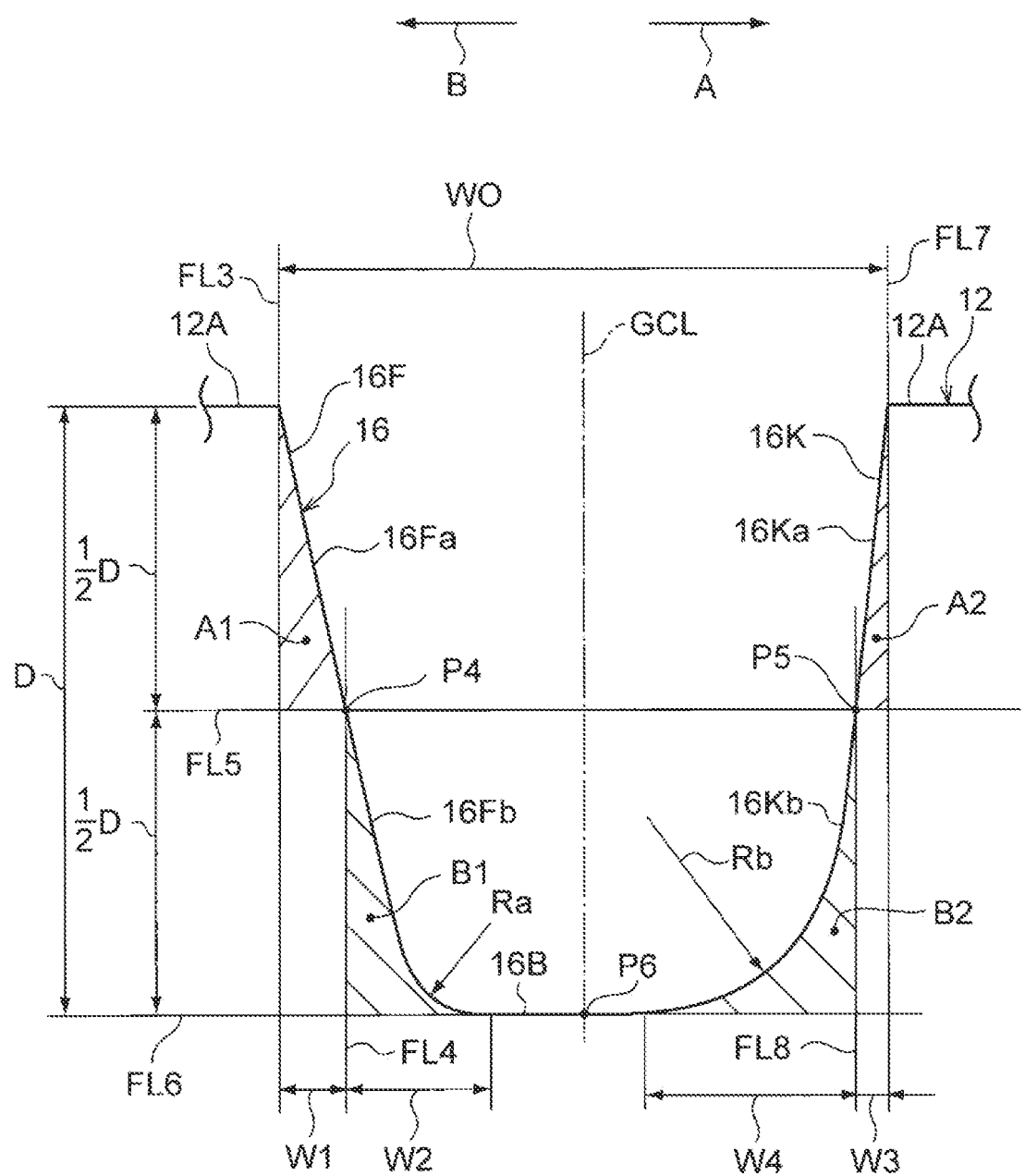
FIG. 4 is a cross-section illustrating a lug groove, taken along a direction orthogonal to the length direction of the lug groove.

As illustrated in FIG. 4, the lug groove 16 of the present exemplary embodiment is formed with an asymmetrical profile on the tire rotation direction side (arrow A direction side) and the opposite direction side to the tire rotation direction side (arrow B direction side) of the groove width (W0) center line GCL.

As illustrated in FIG. 4, in the lug groove 16, on either side of a position P4 at a depth of ½ the groove depth D of the lug groove 16, a groove side-wall 16F on the tread-in side of each block is configured by a tread-in side first inclined portion 16Fa on the tread face 12A side, and a tread-in side second inclined portion 16Fb on the groove-bottom side. On the other hand, on the other side of the groove width center line GCL, on either side of a position P5 at a depth of ½ the groove depth D of the lug groove 16, a groove side-wall 16K on the kick-off side is configured by a kick-off side first inclined portion 16Ka on the tread face 12A side, and a kick-off side second inclined portion 16Kb on the groove-bottom side.

In the lug groove 16, a width dimension of the tread-in side first inclined portion 16Fa measured along the groove width direction is W1, a width dimension of the tread-in side second inclined portion 16Fb measured along the groove width direction is W2, a width dimension of the kick-off side first inclined portion 16Ka measured along the groove width direction is W3, and a width dimension of the kick-off side second inclined portion 16Kb measured along the groove width direction is W4.

Note that the width dimension W2 of the tread-in side second inclined portion 16Fb and the width dimension W4 of the kick-off side second inclined portion 16Kb are preferably set within a range of from 20% to 50% of the groove width W0 of the lug groove 16.

Figure 6:
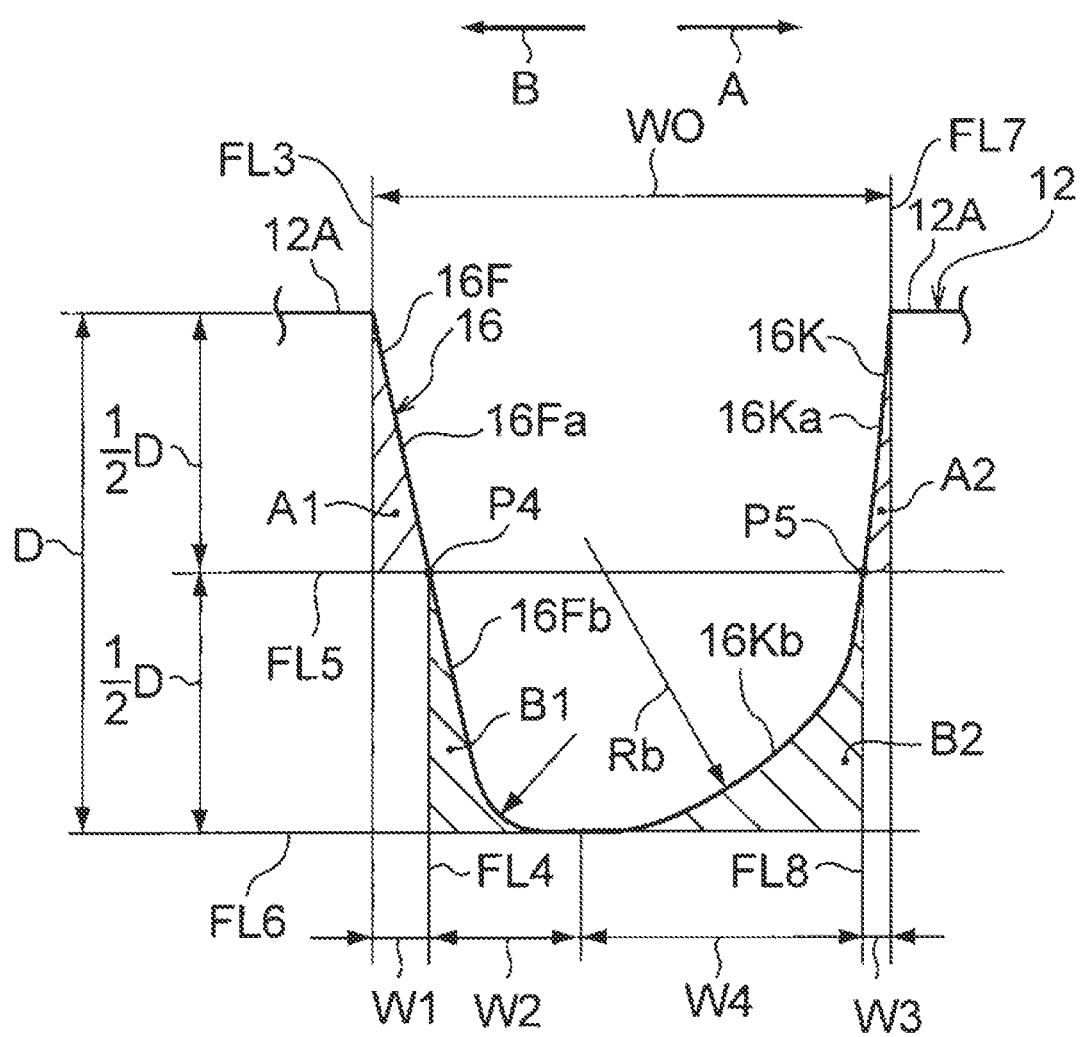
FIG. 6 is a cross-section illustrating a lug groove of a pneumatic tire according to a third exemplary embodiment.

Note that the groove bottom 16B refers to the deepest portion of the lug groove 16. When viewing a cross-section of the lug groove 16 taken orthogonal to the length direction of the lug groove 16, sometimes the groove bottom 16B has a groove width direction dimension, as illustrated in the example of FIG. 4, and sometimes the groove bottom 16B does not have a groove width direction dimension, as illustrated in the example of FIG. 6.

Let an imaginary line passing through an end portion on the tread face 12A side of the tread-in side first inclined portion 16Fa and perpendicular to the tread face 12A be FL3. Let an imaginary line passing through an end portion on the tread face 12A side of the tread-in side second inclined portion 16Fb (=the position P4 at a depth of ½ the groove depth D; an end portion on the groove-bottom side of the tread-in side first inclined portion 16Fa) and perpendicular to the tread face 12A be FL4. Let an imaginary line passing through an end portion on the tread face 12A side of the tread-in side second inclined portion 16Fb (=the position P4 at a depth of ½ the groove depth D) and extending along the groove width direction be FL5. Let an imaginary line passing through the deepest portion of the lug groove 16 (an intersection point P6 of the groove width center line GCL with the groove bottom 16B) and extending along the groove width direction be FL6. Then A1 is set to be less than B1, where A1 is defined as the area of a substantially triangular region (portion with a diagonal line toward the upper right) enclosed by the imaginary line FL3, the imaginary line FL5, and the tread-in side first inclined portion 16Fa, and B1 is defined as the area of a substantially triangular region (portion with a diagonal line toward the upper left) enclosed by the imaginary line FL4, the imaginary line FL6, and the tread-in side second inclined portion 16Fb. Note that the ratio B1/A1 between B1 and A1 is preferably set to 120% or more, is more preferably set to 180% or more to increase the block rigidity, and is even more preferably set to 270% or more. The practical upper limit of the ratio B1/A1 is 500%. However, the upper limit of the ratio B1/A1 may be unbounded (∞: when A1 is 0 (for example, when the tread-in side first inclined portion 16Fa is at a right angle to the tread face 12A)).

Setting A1<B1 enables the block rigidity to be raised on the groove-bottom side of the groove side-wall 16F on the tread-in side of each block while securing the groove volume of the lug grooves 16. Raising the block rigidity on the groove-bottom side of the groove side-wall 16F on the tread-in side of each block enables the block rigidity of the entire tread-in side of each block to be raised.

Note that the ratio B1/A1 between B1 and A1 is preferably set to 120% or more to further increase the block rigidity, is more preferably set to 180% or more to increase the block rigidity even further, and is even more preferably set to 270% or more. The practical upper limit of the ratio B1/A1 is 500%. However, the upper limit of the ratio B1/A1 may be unbounded (∞: when A1 is 0 (for example, when the tread-in side first inclined portion 16Fa is at a right angle to the tread face 12A)).

Further, let an imaginary line passing through an end portion on the tread face 12A side of the kick-off side first inclined portion 16Ka and perpendicular to the tread face 12A be FL7, and let an imaginary line passing through an end portion on the tread face 12A side of the kick-off side second inclined portion 16Kb (=the position P5 at a depth of ½ the groove depth D; an end portion on the groove-bottom side of the kick-off side first inclined portion 16Ka) and perpendicular to the tread face 12A be FL8. Then A2 is set to be less than B2, where A2 is defined as the area of a substantially triangular region (portion with a diagonal line toward the upper right) enclosed by the imaginary line FL7, the imaginary line FL5, and the kick-off side first inclined portion 16Ka, and B2 is defined as the area of a substantially triangular region (portion with a diagonal line toward the upper left) enclosed by the imaginary line FL8, the imaginary line FL6, and the kick-off side second inclined portion 16Kb. Note that the ratio B2/A2 between B2 and A2 is preferably set to 120% or more, is more preferably set to 180% or more to increase the block rigidity, and is even more preferably set to 270% or more. The practical upper limit of the ratio B2/A2 is 500%. However, the upper limit of the ratio B2/A2 may be unbounded (∞: when A2 is 0 (for example, when the kick-off side first inclined portion 16Ka is at a right angle to the tread face 12A)).

Setting A2<B2 enables the block rigidity to be raised on the groove-bottom side of the groove side-wall 16K on the kick-off side of the center-side blocks 22 and the shoulder-side blocks 26 while securing the groove volume of the lug grooves 16. Raising the block rigidity on the groove-bottom side of the groove side-wall 16K on the kick-off side of each block enables the block rigidity of the entire kick-off side of each block to be raised.

Further, in the present exemplary embodiment, when comparing the ratio B1/A1 to the ratio B2/A2, the ratio B1/A1 is set to be less than the ratio B2/A2. The block rigidity on the kick-off side is thereby raised to a greater extent than the block rigidity on the tread-in side of the center-side blocks 22 and the shoulder-side blocks 26.

Moreover, in the lug groove 16 of the present exemplary embodiment, a radius of curvature Ra of a circular arc shaped portion of the tread-in side second inclined portion 16Fb and a radius of curvature Rb of a circular arc shaped portion of the kick-off side second inclined portion 16Kb increase on progression from the tire equatorial plane CL side toward the ground contact edge 12E. As a result, the width dimension W2 of the tread-in side second inclined portion 16Fb and the width dimension W4 of the kick-off side second inclined portion 16Kb increase, and the area B1 and the area B2 increase on progression from the tire equatorial plane CL side toward the ground contact edge 12E. The block rigidity on the tread-in side and the block rigidity on the kick-off side of the center-side blocks 22 and the shoulder-side blocks 26 thereby increase on progression from the tire equatorial plane CL side toward the ground contact edge 12E.

Operation and Advantageous Effects

In conventional pneumatic tires, groove side-walls of grooves partitioning blocks are inclined in their entirety to increase block rigidity. However, this decreases the volume of the grooves and decreases wet performance, such that it is difficult to achieve both a high degree of block rigidity and a high degree of wet performance. In contrast, the pneumatic tire 10 of the present exemplary embodiment can achieve both a high degree of block rigidity and a high degree of wet performance. Explanation follows regarding operation and advantageous effects of the pneumatic tire 10 of the present exemplary embodiment when mounted to a vehicle.

When the pneumatic tire 10 is traveling on a wet road surface, water in the plane of ground contact (water between the tread face 12A of the tread 12 and the road surface) is taken into the center circumferential direction groove 14, the lug grooves 16, and the shoulder-side circumferential direction grooves 20, and expelled to the tire circumferential direction outside by the center circumferential direction groove 14 and the shoulder-side circumferential direction grooves 20 and expelled to the tire width direction outer side by the lug grooves 16. Note that some of the water that has been taken in to the center circumferential direction groove 14 and the shoulder-side circumferential direction grooves 20 is expelled to the tire width direction outer side by the lug grooves 16. The pneumatic tire 10 of the present exemplary embodiment obtains wet performance by expelling the water in the plane of ground contact in this manner. Further, in the pneumatic tire 10 of the present exemplary embodiment, the center circumferential direction groove 14 extending along the tire circumferential direction is disposed on the tire equatorial plane CL, enabling water expelling performance to be raised at a tire center section where contact pressure with the ground is high.

On the tread-in side of each block of the pneumatic tire 10 of the present exemplary embodiment, when comparing the area A1 of the substantially triangular region enclosed by the imaginary line FL3, the imaginary line FL5, and the tread-in side first inclined portion 16Fa against the area B1 of the substantially triangular region enclosed by the imaginary line FL4, the imaginary line FL6, and the tread-in side second inclined portion 16Fb, A1 is set to be less than B1. This enables rigidity to be raised on the groove-bottom side of the tread-in side of each block (namely, a base portion on the tread-in side of each block) of the center-side blocks 22 and the shoulder-side blocks 26, thereby enabling block rigidity to be raised on the tread-in side of each block while securing the groove volume necessary for water expelling performance of the lug grooves 16.

Moreover, on the kick-off side of each block of the pneumatic tire 10 of the present exemplary embodiment, when comparing the area A2 of the substantially triangular region enclosed by the imaginary line FL7, the imaginary line FL5, and the kick-off side first inclined portion 16Ka against the area B2 of the substantially triangular region enclosed by the imaginary line FL8, the imaginary line FL6, and the kick-off side second inclined portion 16Kb, A2 is set to be less than B2. This enables rigidity to be raised on the groove-bottom side of the kick-off side of each block (namely, a base portion on the kick-off side of each block), thereby enabling block rigidity to be raised on the kick-off side of each block while securing the groove volume necessary for water expelling performance of the lug grooves 16.

As explained above, in the pneumatic tire 10 of the present exemplary embodiment, the block rigidity on the tread-in side and the block rigidity on the kick-off side of each block are raised, enabling the block rigidity of the overall block necessary for steering stability on a dry road surface to be increased. Further, in the pneumatic tire 10 of the present exemplary embodiment, the groove side-walls are not inclined in their entirety to raise block rigidity, which would increase the amount of rubber used in the tread 12. This thereby enables an increase in roll resistance to be suppressed.

In this manner, the pneumatic tire 10 of the present exemplary embodiment can achieve a high degree of both wet performance and dry performance by obtaining wet performance (hydroplaning performance in particular) and dry performance (steering stability on a dry road surface in particular). Further, by suppressing deformation of each block of the center-side blocks 22 and the shoulder-side blocks 26, drag of the blocks against the road surface can be suppressed, enabling anti-wear characteristics of the blocks to be improved.

Moreover, in the pneumatic tire 10 of the present exemplary embodiment, the ratio B1/A1 is set to be less than the ratio B2/A2, and the block rigidity on the kick-off side is raised to a greater extent than the block rigidity on the tread-in side of each of the blocks configuring the center-side blocks 22 and the shoulder-side blocks 26. Thus, compared to cases in which the block rigidity on the tread-in side is raised to a greater extent than the block rigidity on the kick-off side, tire circumferential direction deformation can be effectively suppressed when the pneumatic tire 10 rotates in the arrow A direction (when driving) and each block contacts the road surface.

Further, in the pneumatic tire 10 of the present exemplary embodiment, the radius of curvature Ra of the circular arc shaped portion of the tread-in side second inclined portion 16Fb and the radius of curvature Rb of the circular arc shaped portion of the kick-off side second inclined portion 16Kb of the lug groove 16 increase on progression from the tire equatorial plane CL side toward the ground contact edge 12E such that area B1 and area B2 increase on progression from the tire equatorial plane CL side toward the ground contact edge 12E. This enables block rigidity on the tread-in side and the block rigidity on the kick-off side of the center-side blocks 22 and the shoulder-side blocks 26 to increase on progression from the tire equatorial plane CL side toward the ground contact edge 12E. Accordingly, when a large load is borne on the shoulder side, namely the ground contact edge 12E side, of the tread during cornering, deformation of the shoulder-side blocks 26 on the ground contact edge 12E side can be effectively suppressed, enabling cornering performance to be improved while securing groove volume on the ground contact edge 12E side of the lug grooves 16.

The lug-groove bottom side of the tread-in side second inclined portion 16Fb and the lug-groove bottom side of the kick-off side second inclined portion 16Kb are formed in circular arc shapes. Thus, stress is suppressed from concentrating at the groove bottom 16B of the lug groove 16, and cracks starting from the groove bottom 16B are suppressed from occurring. Moreover, water expelling performance is improved because water flow tends to be laminar flow rather than turbulent flow when water flows within the lug groove 16.

The width dimension W2 of the tread-in side second inclined portion 16Fb and the width dimension W4 of the kick-off side second inclined portion 16Kb are set within a range of from 20% to 50% of the groove width W0 of the lug groove 16, thereby enabling a high degree of both block rigidity and water expelling performance to be achieved. Note that when the proportion of the width dimension W2 and the proportion of the width dimension W4 with respect to the groove width W0 of the lug groove 16 is less than 20%, it becomes difficult to sufficiently increase the block rigidity. On the other hand, when the proportion of the width dimension W2 and the proportion of the width dimension W4 with respect to the groove width W0 of the lug groove 16 exceeds 50%, it becomes difficult to secure sufficient volume for the lug grooves 16. Further, making either one of the width dimension W2 or the width dimension W4 too large would make it impossible to increase the size of the other.

Note that the angle of inclination θ0 of the lug groove 16 with respect to the tire width direction gradually decreases on progression toward the ground contact edge 12E, and moreover, the change in the angle of inclination θ0 of the lug groove 16 with respect to the tire width direction is larger at the ground contact edge 12E side than at the tire width direction center side. The direction in which the lug groove 16 extends accordingly approaches the direction in which water between the tread 12 and the road surface readily flows toward the outside of the ground contact plane. This enables water expelling performance to be improved and wet performance to be improved.

The lug groove 16 causes water taken into the plane of ground contact when traveling on a wet road surface to flow from the tire equatorial plane CL side toward the ground contact edge 12E side, and expels the water from the end portion on the ground contact edge 12E side to the tire outside. In the vicinity of the ground contact edge 12E, the groove bottom 16B is inclined such that the groove depth of the lug groove 16 gradually becomes shallower on progression toward the ground contact edge 12E, and the angle of inclination θ1 of the groove bottom 16B is set to no more than 5°. Water that has been taken into the groove can thereby be made to flow smoothly toward the ground contact edge 12E and be expelled in the vicinity of the ground contact edge 12E, thereby enabling wet performance to be improved. Further, the groove width of the lug groove 16 of the present exemplary embodiment widens on progression from the tire equatorial plane CL side toward the ground contact edge 12E side. This, too, enables water expelling performance from the tire equatorial plane CL side toward the ground contact edge 12E side to be improved, thereby enabling wet performance to be further improved.

Further, in the pneumatic tire 10 of the present exemplary embodiment, in the vicinity of the ground contact edge 12E, the groove bottom 16B is inclined such that the groove depth of the lug groove 16 gradually becomes shallower on progression toward the ground contact edge 12E. There is accordingly no concern of block rigidity decreasing as there would be in a case in which the groove bottom 16B is inclined such that the groove depth of the lug groove 16 gradually becomes deeper on progression toward the ground contact edge 12E, and so block rigidity in the vicinity of the ground contact edge 12E necessary for dry performance is secured. A high degree of both wet performance and dry performance can be achieved by setting the angle of inclination θ1 of the groove bottom 16B of the lug groove 16 to no more than 5° in this manner.

Note that in the pneumatic tire 10 of the present exemplary embodiment, preferably a<c is satisfied, where a (mm$^2$) is the cross-sectional area at a connection portion of the lug groove 16 to the center circumferential direction groove 14 and c (mm$^2$) is a cross-sectional area of the lug groove 16 at the ground contact edge 12E. This is because setting a small cross-sectional area a on the entry side of water flowing into the lug groove 16 and setting a larger cross-sectional area c on the exit side of water flowing in the lug groove 16 enables turbulent flow to be suppressed from occurring as a result of an increase in the amount of water due to water from the center circumferential direction groove 14 converging with the lug groove 16, enabling water expelling performance in which the lug groove 16 acts as one main water flow path to be improved, and thus enabling water expelling performance of the pneumatic tire 10 to be improved. Specifically, the groove width of the lug groove 16 is preferably from 0 mm to 2.0 mm at the tread width direction inner side end portion, and is preferably from 9.0 mm to 12.0 mm at the ground contact edge 12E.

Preferably b<c is satisfied, where b (mm$^2$) is the cross-sectional area of a connecting portion between one tire circumferential direction side end portion of the shoulder-side circumferential direction groove 20 and the lug groove 16. This is because turbulent flow can be suppressed from occurring as a result of an increase in the amount of water due to water from the shoulder-side circumferential direction groove 20 converging with the lug groove 16, thereby enabling water expelling performance in which the lug groove 16 acts as a main water flow path to be further improved. For similar reasons, the ratio b/c is preferably 0.60 or less, and is even more preferably 0.42 or less. On the other hand, the ratio b/c is preferably 0.07 or more in order to secure the amount of water expelled from the shoulder-side circumferential direction grooves 20.

The cross-sectional area a is preferably from 0 mm$^2$ to 18 mm$^2$. This is because setting the cross-sectional area a to 0 mm$^2$ or greater enables traction on snow to be improved, while setting the cross-sectional area a to no more than 18 mm$^2$ suppresses turbulent flow from occurring as described above, and enables water expelling performance in which the lug groove 16 acts as a main water flow path to be further improved.

Further, the cross-sectional area b is preferably from 8 mm$^2$ to 46 mm$^2$. This is because setting the cross-sectional area b to no less than 8 mm$^2$ enables snow clogging to be suppressed and the amount of water expelled from a circumferential direction groove 3b to be secured, while setting the cross-sectional area b to no more than 46 mm$^2$ suppresses turbulent flow from occurring as described above, and enables water expelling performance in which the lug groove 16 acts as a main water flow path to be further increased.

Moreover, the cross-sectional area c is preferably from 77 mm$^2$ to 110 mm$^2$. This is because setting the cross-sectional area c to no less than 77 mm$^2$ secures the amount of water flowing in the lug groove 16, this being the main water flow path, thereby enabling water expelling performance to be improved, while setting the cross-sectional area c to no more than 110 mm$^2$ secures ground contact surface area, thus enabling dry road surface travel performance and the like to be secured.

Note that in the pneumatic tire 10 of the present exemplary embodiment, the ratio B1/A1 is set to be less than the ratio B2/A2, such that the block rigidity on the kick-off side is raised to a greater extent than the block rigidity of the tread-in side of each block configuring the center-side blocks 22 and the shoulder-side blocks 26. However, the present invention is not limited thereto. The ratio B1/A1 may be set to be greater than the ratio B2/A2, such that the block rigidity on the tread-in side is raised to a greater extent than the block rigidity of the kick-off side of each block configuring the center-side blocks 22 and the shoulder-side blocks 26.

Further, in the tread 12, in cases in which, for example, both shoulder-side blocks 26 having a long circumferential direction dimension and shoulder-side blocks 26 having a short circumferential direction dimension are present, the shoulder-side blocks 26 having a short circumferential direction dimension have less block rigidity relative to the shoulder-side blocks 26 having a long circumferential direction dimension. In such cases, it is preferable that the rigidity of the groove side-walls on the side of the shoulder-side blocks 26 having a short circumferential direction dimension be raised to a greater extent than the rigidity of the groove side-walls on the side of the shoulder-side blocks 26 having a long circumferential direction dimension by, for example, employing a method to make the radius of curvature Ra on the tread-in side and the radius of curvature Rb on the kick-off side of the lug grooves 16 partitioning the shoulder-side blocks 26 having a short circumferential direction dimension larger than the radius of curvature Ra on the tread-in side and the radius of curvature Rb on the kick-off side of the lug grooves 16 partitioning the shoulder-side blocks 26 having a long circumferential direction dimension. Thus, while still securing the groove volume of the lug grooves 16, the advantageous effect of increasing the block rigidity of the shoulder-side blocks 26 having a short circumferential direction dimension is greater than the advantageous effect of increasing the block rigidity of the shoulder-side blocks 26 having a long circumferential direction dimension. This thereby enables the difference in block rigidity to be reduced between the shoulder-side blocks 26 having a short circumferential direction dimension and the shoulder-side blocks 26 having a long circumferential direction dimension.

It is sufficient that the lug grooves 16 extend in the tire width direction or extend inclined at an angle of no more than 45° with respect to the tire width direction. Water expelling performance can be increased by extending the lug grooves 16 along the direction in which water flows during tire rotation. The groove depth (maximum depth) of the lug groove 16 is preferably from 1.0 mm to 9.2 mm in order to secure the groove volume to expel water. The lug grooves 16 are preferably disposed at a pitch interval of from 16 mm to 20 mm in the tire circumferential direction in order to achieve a high degree of both water expelling performance, and braking performance and steering stability on dry road surfaces and icy/snowy road surfaces. As illustrated in FIG. 1, the lug grooves 16 are preferably disposed with a phase difference around the tread circumferential direction imparted between one tire width direction side and the other tire width direction side of the tire equatorial plane CL, in order to decrease pattern noise.

The shoulder-side circumferential direction groove 20 preferably extends in the tire circumferential direction or extends inclined at an angle of 0° or greater, but less than 45°, with respect to the tire circumferential direction in order to achieve a high degree of both water expelling performance, and steering stability on icy/snowy road surfaces. The groove width of the shoulder-side circumferential direction groove 20 is preferably from 2.0 mm to 10.0 mm in order to achieve a high degree of both water expelling performance, and braking performance and steering stability on dry road surfaces and icy/snowy road surfaces. The groove depth (maximum depth) of the shoulder-side circumferential direction groove 20 is preferably from 4.0 mm to 9.2 mm in order to achieve a high degree of both water expelling performance, and braking performance and steering stability on dry road surfaces and icy/snowy road surfaces.

Note that in the pneumatic tire 10 of the present exemplary embodiment, the negative ratio of the tread face 12A of the tread 12 (the proportion of the groove area within the tread face 12A of the tread 12 with respect to the area of the tread face 12A of the tread 12) is preferably set from 33% to 40% in order to achieve a high degree of both water expelling performance, and braking performance and steering stability on dry road surfaces and icy/snowy road surfaces. In order for the lug grooves 16 to sufficiently function as main water flow paths, the groove area of the lug grooves 16 is preferably greater than that of the shoulder-side circumferential direction grooves 20, and 50% or more of the total groove area is preferably the groove area of the lug grooves 16.

Second Exemplary Embodiment

Figure 5:
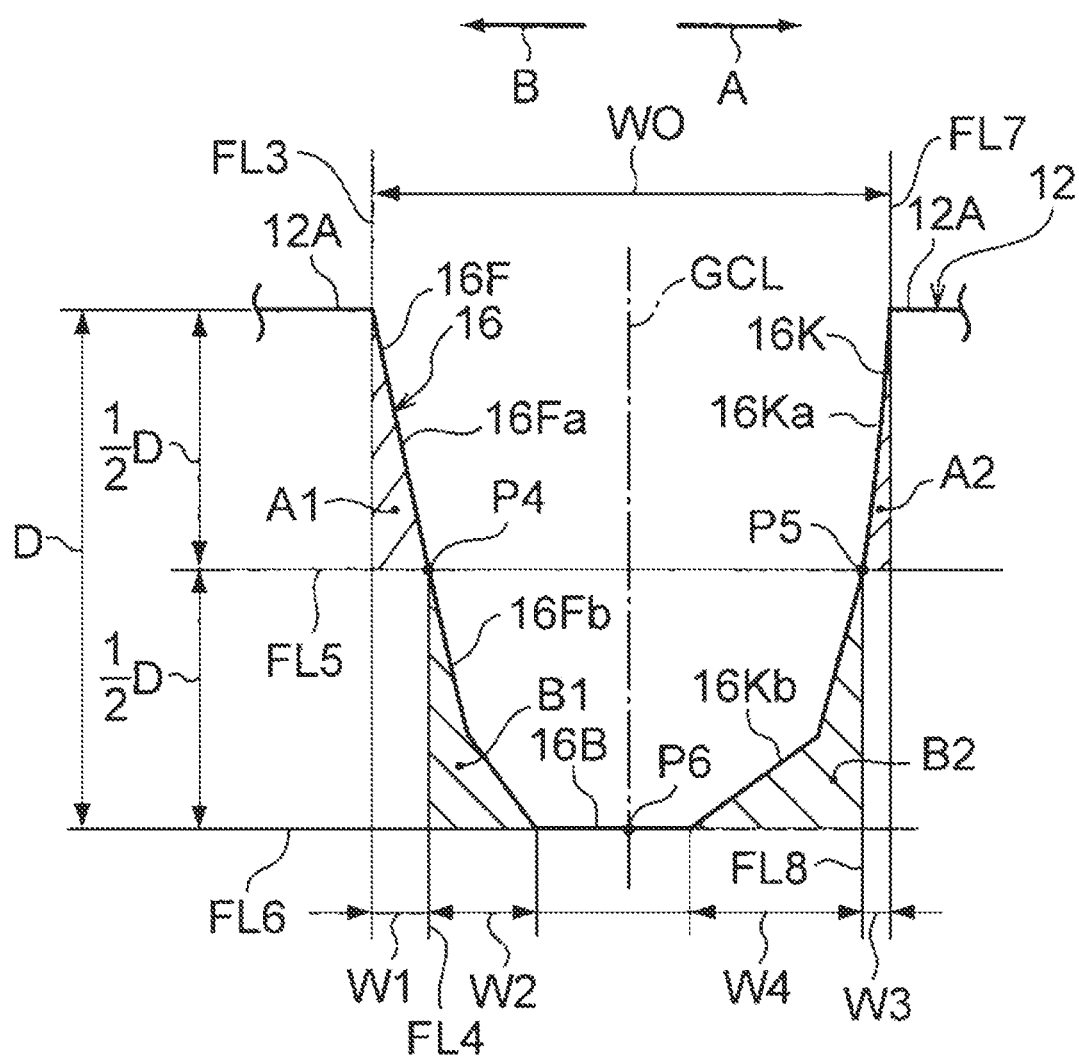
FIG. 5 is a cross-section illustrating a lug groove of a pneumatic tire according to a second exemplary embodiment.

Next, explanation follows regarding a pneumatic tire 10 according to a second exemplary embodiment of the present invention, with reference to FIG. 5. Note that configurations the same as those of the first exemplary embodiment are appended with the same reference numerals, and explanation thereof is omitted.

As illustrated in FIG. 5, in the lug grooves 16 of the pneumatic tire 10 of the present exemplary embodiment, the groove side-wall 16F on the tread-in side and the groove side-wall 16K on the kick-off side are formed with plural straight line portions.

Similarly to in the first exemplary embodiment, A1 is set to be less than B1, and A2 is set to be less than B2 in the pneumatic tire 10 of the present exemplary embodiment too, thereby enabling the block rigidity of each block to be increased while securing the groove volume necessary for water expelling performance of the lug groove 16.

Third Exemplary Embodiment

Next, explanation follows regarding a pneumatic tire 10 according to a third exemplary embodiment of the present invention, with reference to FIG. 6. Note that configurations the same as those of the first exemplary embodiment are appended with the same reference numerals, and explanation thereof is omitted.

As illustrated in FIG. 6, in the lug grooves 16 of the pneumatic tire 10 of the present exemplary embodiment, the radius of curvature Ra of the circular arc shaped portion of the tread-in side second inclined portion 16Fb and the radius of curvature Rb of the circular arc shaped portion of the kick-off side second inclined portion 16Kb are set larger than in the first exemplary embodiment, and the circular arc shaped portion of the tread-in side second inclined portion 16Fb and the circular arc shaped portion of the kick-off side second inclined portion 16Kb are connected smoothly to each other.

Similarly to in the first exemplary embodiment, A1 is set to be less than B1, and A2 is set to be less than B2 in the pneumatic tire 10 of the present exemplary embodiment too, thereby enabling the block rigidity of each block to be increased while securing the groove volume necessary for water expelling performance of the lug groove 16.

Further, the block rigidity in the present exemplary embodiment can be raised to a greater extent than in the first exemplary embodiment due to the radius of curvature Ra and the radius of curvature Rb being set larger than in the first exemplary embodiment.

Fourth Exemplary Embodiment

Next, explanation follows regarding a pneumatic tire 10 according to a fourth exemplary embodiment of the present invention, with reference to FIG. 7 to FIG. 10. Note that configurations the same as those of the first exemplary embodiment are appended with the same reference numerals, and explanation thereof is omitted.

Figure 7:
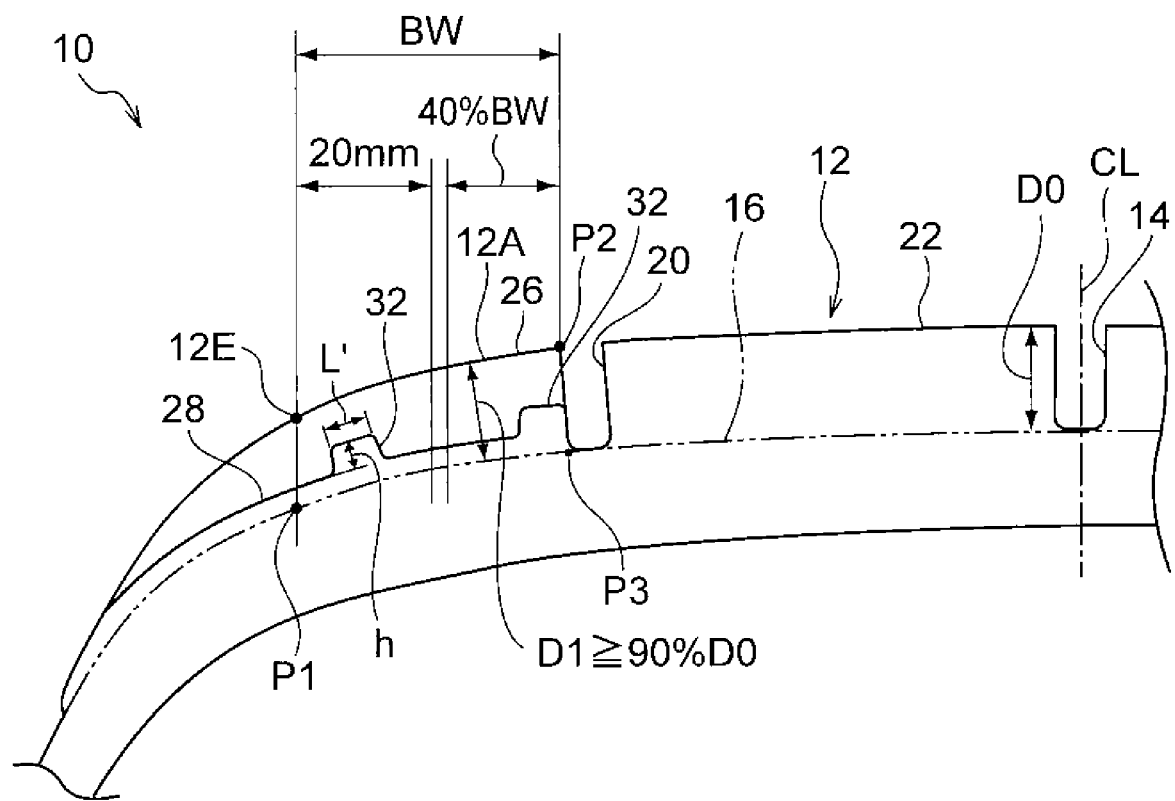
FIG. 7 is a cross-section illustrating a lug groove, taken along the length direction of the lug groove.

As illustrated in FIG. 7, in the pneumatic tire 10 of the present exemplary embodiment, the average of the groove depth D1 between the intersection point P1 and the intersection point P3 (directly under the ⅓ point P2) of the groove bottom 16B of the lug groove 16 is set to be no less than 90% of the groove depth D0 of the end portion of the lug groove 16 on the tire equatorial plane CL side.

Figure 8:
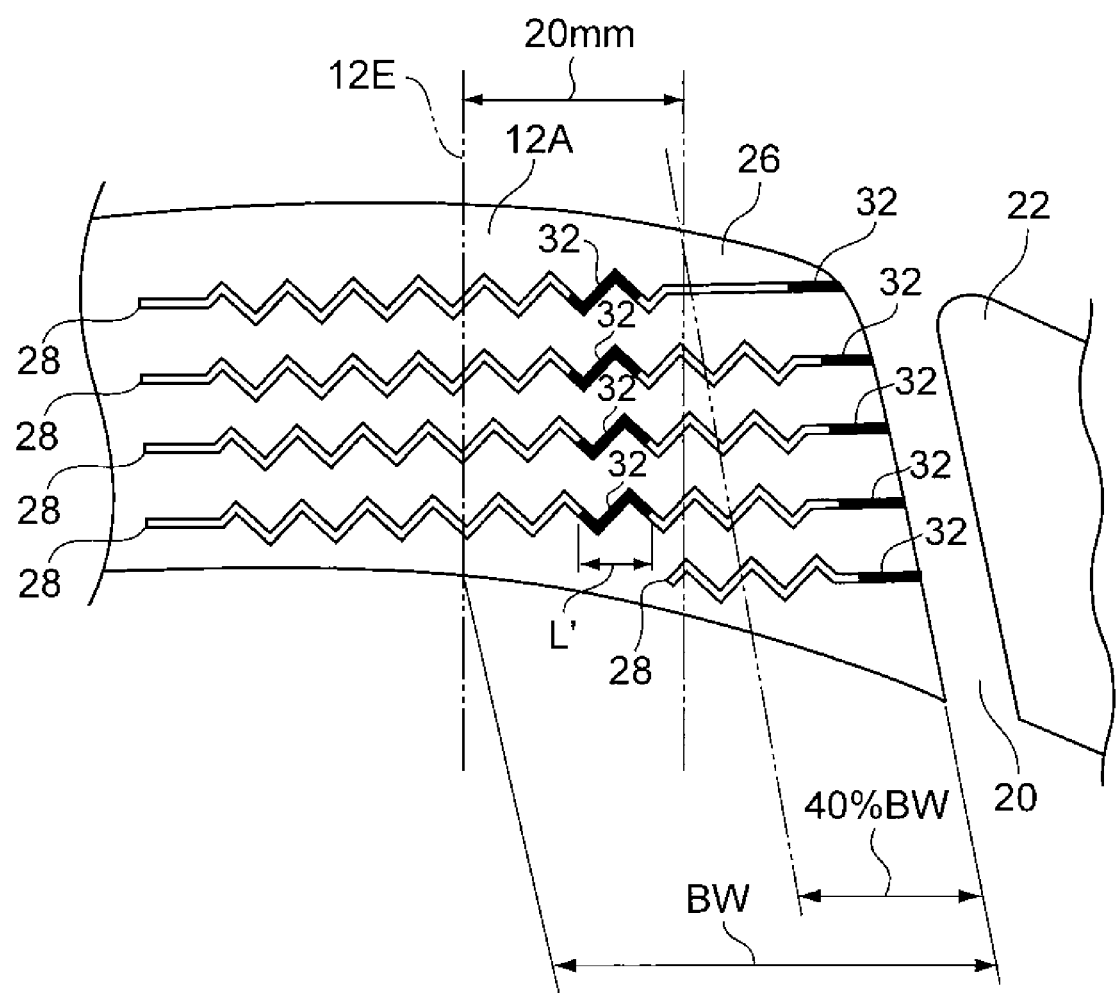
FIG. 8 is a plan view illustrating a third block.

In cases in which in the groove depth of the lug groove 16 is set such that D1≤90% D0 in this manner, as illustrated in FIG. 7 and FIG. 8, raised-bottom portions 32 projecting from the groove bottom 16B to give a shallower groove depth are preferably provided in the sipes 28 disposed at the tire width direction outer side of the ⅓ point P2, namely inside the sipes 28 of the shoulder-side block 26 in the present exemplary embodiment, in order to increase the block rigidity of the shoulder-side blocks 26.

As illustrated in FIG. 7 and FIG. 8, a length L' of the raised-bottom portions 32 provided at the sipes 28 is preferably set to no less than 1.5 mm in order to increase block rigidity.

As illustrated in FIG. 7, a height dimension h of the raised-bottom portion 32 (measured from the groove bottom of the sipe 28) is smaller than the groove depth dimension of the sipe 28, and the position of an apex of the raised-bottom portion 32 is lower than the tread face 12A of the tread 12 (namely, at the tire radial direction inside). In the present exemplary embodiment, two of the raised-bottom portions 32 are provided in each sipe 28; however, it is sufficient if at least one is provided, and three or more may be provided, and the raised-bottom portions 32 may be provided at locations where increasing block rigidity is desired.

As illustrated in FIG. 7 and FIG. 8, plural sipes 28 are formed in each shoulder-side block 26 so as to extend from the tire width direction inner side end toward the tire width direction outer side and traverse the ground contact edge 12E. In cases in which the sipes 28 have a groove depth 60% or greater of the groove depth of the lug groove 16, it is preferable that at least half of the sipes 28 out of the plural sipes 28 are provided with raised-bottom portions 32 (first raised-bottom portions of the present invention) having a height h of from 2 mm to 4 mm within a range from the ground contact edge 12E to 20 mm toward the tire width direction inner side in order to increase the block rigidity on the ground contact edge 12E side of the shoulder-side block 26. The advantageous effect of increased block rigidity would be insufficient were the height h of the raised-bottom portions 32 less than 2 mm, and block rigidity would be too high locally were the height h of the raised-bottom portions 32 over 4 mm.

Moreover, it is preferable that the raised-bottom portions 32 (second raised-bottom portions of the present invention) be provided within a range of 40% of a ground contact width (in the tire width direction) of the shoulder-side blocks 26 from the tire width direction inner side end toward the ground contact edge 12E side of the shoulder-side blocks 26 in order to increase the block rigidity of the shoulder-side blocks 26 on the tire width direction inner side. Note that it is preferable that the height of the raised-bottom portions 32 provided within a range of 40% of the ground contact width (in the tire width direction) of the shoulder-side blocks 26 from the tire width direction inner side end toward the ground contact edge 12E side of the shoulder-side blocks 26 be from 2 mm to 5 mm.

As illustrated in FIG. 8, in cases in which the raised-bottom portions 32 are provided at each sipe 28 within a range of 40% of the ground contact width BW (in the tire width direction) of the shoulder-side blocks 26 from the tire width direction inner side end toward the ground contact edge 12E side of the shoulder-side blocks 26, and the raised-bottom portions 32 form a row in a straight line shape along one direction such that block rigidity might become too high locally, although omitted from illustration, it is preferable that sipes 28 provided with raised-bottom portions 32 having high heights (for example, raised-bottom portions 32 having a 5 mm height) and sipes 28 provided with raised-bottom portions 32 having low heights relative to the raised-bottom portions 32 having high heights (for example, raised-bottom portions 32 having a 2 mm height) are disposed alternately in the tire circumferential direction. This enables the block rigidity of the tire width direction inner side portions of the shoulder-side blocks 26 to be raised appropriately, enabling anti-wear characteristics of the shoulder-side blocks 26 to be improved.

Figure 9:
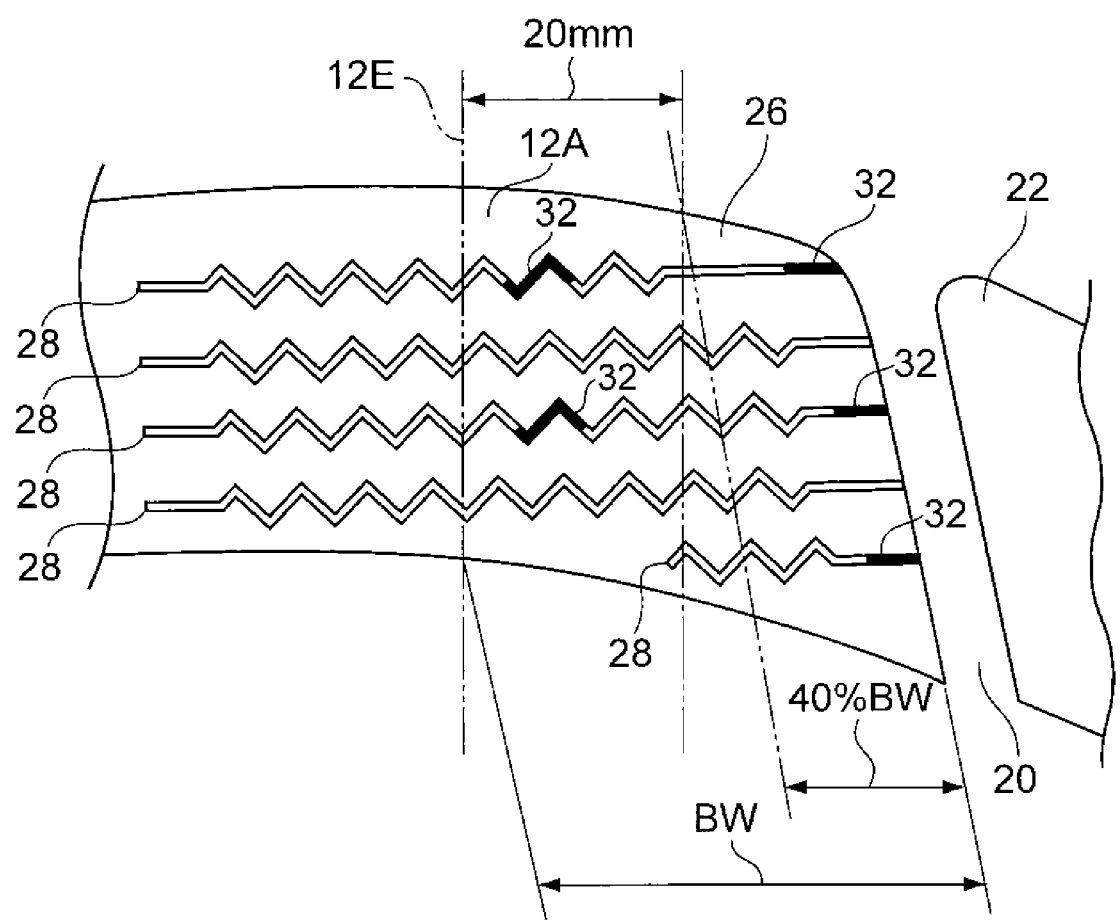
FIG. 9 is a plan view illustrating a third block.

Further, in cases in which plural sipes 28 provided with the raised-bottom portions 32 are formed on the shoulder-side blocks 26, and the raised-bottom portions 32 form a row in a straight line shape along one direction such that the block rigidity might become too high locally, as illustrated in FIG. 9, local increases in block rigidity can be suppressed and block rigidity can be increased appropriately by disposing the sipes 28 provided with raised-bottom portions 32 and sipes 28 that are not provided with raised-bottom portions 32 alternately in the tire circumferential direction.

Figure 10:
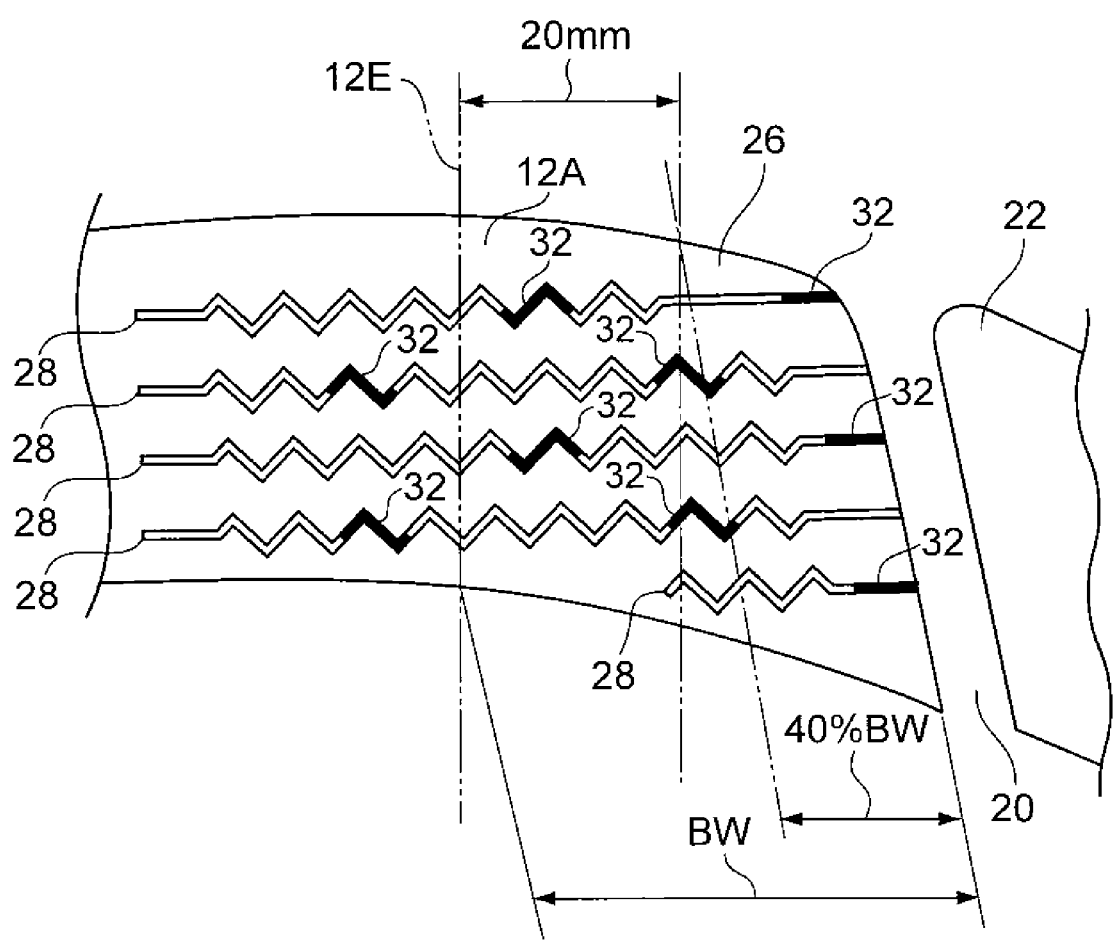
FIG. 10 is a plan view illustrating a third block.

Moreover, in cases in which plural sipes 28 provided with the raised-bottom portions 32 are arrayed in the tire circumferential direction, as illustrated in FIG. 10, local increases in block rigidity can be suppressed and block rigidity can be increased appropriately by arranging a raised-bottom portion 32 of one of the sipes 28 and a raised-bottom portion 32 of another of the sipes 28 so as to be offset from each other in the tire width direction such that the raised-bottom portions 32 of adjacent sipes 28 in the tire circumferential direction are not alongside each other in the tire circumferential direction.

Fifth Exemplary Embodiment

Figure 11:
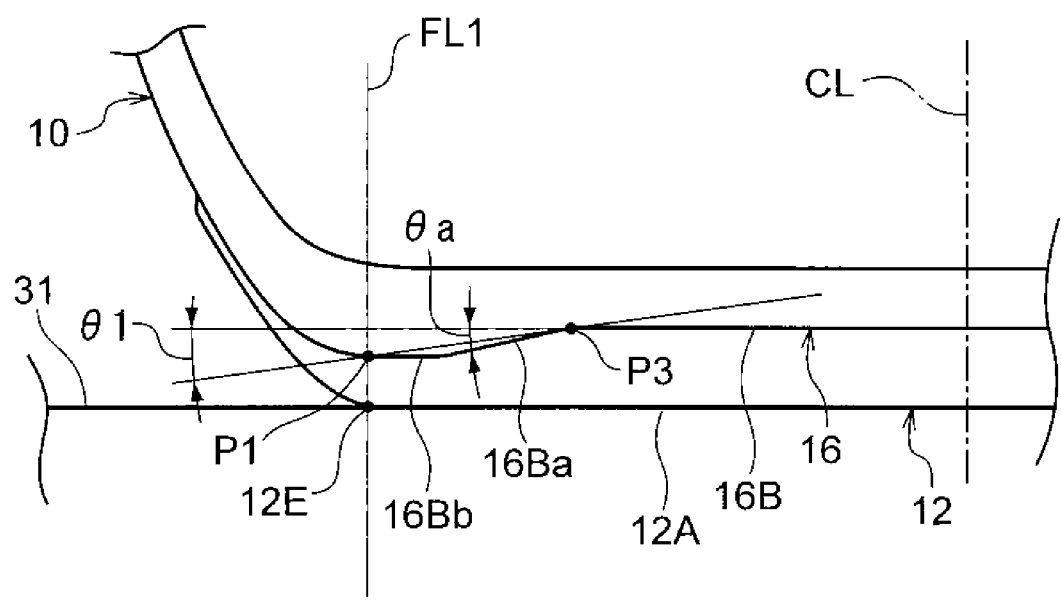
FIG. 11 is a cross-section illustrating a lug groove, taken along a direction orthogonal to the length direction of the lug groove in a pneumatic tire employed in testing.

Next, explanation follows regarding a pneumatic tire 10 according to a fifth exemplary embodiment of the present invention, with reference to FIG. 11. Note that configurations the same as those of the exemplary embodiments described above are appended with the same reference numerals, and explanation thereof is omitted.

As illustrated in FIG. 11, in the lug groove 16 of the pneumatic tire 10 of the present exemplary embodiment, a parallel portion 16Bb having a constant groove depth where the tread face 12A and the groove bottom 16B are parallel to each other is provided from the ground contact edge 12E toward the tire width direction inner side, and an inclined portion 16Ba inclined in a direction of deepening groove depth is provided at a tire width direction inner side of the parallel portion 16Bb. Note that from the tire width direction inner side end of the inclined portion 16Ba toward the tire equatorial plane CL side, the tread face 12A and the groove bottom 16B are parallel to each other and set with a constant groove depth. Note that in the present exemplary embodiment too, the average of the angle of inclination θ1 of the groove bottom 16B of the lug groove 16 from the intersection point P1 to the intersection point P3 with respect to the tread face 12A contacting the road surface 31 is set to no more than 5°.

Between the intersection point P1 and the intersection point P3, the groove bottom 16B of the lug groove 16 of the pneumatic tire 10 of the present exemplary embodiment is not inclined at a constant angle, and the parallel portion 16Bb that runs parallel to the tread face 12A is provided on the ground contact edge 12E side. However, the average angle of inclination of the groove bottom 16B of the lug groove 16 from the intersection point P1 to the intersection point P3 is set to be no more than 5°, and in the vicinity of the ground contact edge 12E, the groove bottom 16B is parallel to the tread face 12A (road surface 31) and has a constant groove depth. Thus, water taken into the lug groove 16 flows smoothly in the vicinity of the ground contact edge 12E and turbulent flow does not occur, and is expelled from the ground contact edge 12E toward the outside of the ground contact plane.

Other Exemplary Embodiments

Explanation has been given of some exemplary embodiments of the present invention; however, the present invention is not limited thereto. Obviously various other modifications may be implemented within a range not departing from the spirit of the present invention.

In the lug groove 16, as a minimum, is it sufficient to set at least one out of A1<B1 or A2<B2. The cross-section profile of the lug groove 16, namely, the cross-section profiles of the groove side-wall 16F on the tread-in side, the groove side-wall 16K on the kick-off side, and the groove bottom 16B are not limited to those illustrated in FIGS. 4, 5, and 6, and may be formed by curved lines other than circular arcs, or subjected to various modifications. Further, in a comparison of the ratio B1/A1 to the ratio B2/A2, the ratio B1/A1 may be set greater than the ratio B2/A2, or the ratio B1/A1 may be set equal to the ratio B2/A2.

Test Example 1

To verify the advantageous effects of the present invention, prototypes of a conventional example, a comparative example, and tires 1 to 5 of Examples applied with the present invention were produced. Each of the tires had the tread pattern illustrated in FIG. 1, while the shapes of the groove bottoms of the lug grooves in the vicinity of the ground contact edge differed from each other. Note that in Examples 1 to 4, the sipes did not include raised-bottom portions, and in Example 5, the sipes were provided with raised-bottom portions.

The following tests were performed on each tire to evaluate hydroplaning performance (water expelling performance) on a wet road surface, braking performance on a dry road surface, and anti-wear characteristics.

Explanation follows regarding the test tires.

Conventional Example the lug grooves were set to a constant groove depth of 9 mm from the end portion on the tire equatorial plane side to the ⅓ point, and the groove bottom was inclined at an angle of 6° from the ⅓ point toward the ground contact edge.

Example 1 a constant groove depth of 9 mm was set from the end portion on the tire equatorial plane side to the ⅓ point, and the groove bottom was inclined at an angle of 5° from the ⅓ point toward the ground contact edge.

Example 2 a constant groove depth of 9 mm was set from the end portion on the tire equatorial plane side to the ⅓ point, and the groove bottom was inclined at an angle of 1° from the ⅓ point toward the ground contact edge.

Comparative Example 1 the lug grooves were set to a constant groove depth of 9 mm from the end portion on the tire equatorial plane side toward the ground contact edge.

Example 3

As illustrated in FIG. 11, the parallel portion 16Bb having a constant groove depth in the vicinity of the ground contact edge 12E was provided at the groove bottom 16B of the lug grooves 16, and the inclined portion 16Ba inclined in the direction of deepening groove depth was provided at a tire width direction inner side of the parallel portion 16Bb. Note that the groove bottom 16B was inclined 3° (the average angle of inclination θ1) from the ⅓ point toward the ground contact edge. In Example 3, the length of the parallel portion 16Bb as measured in the groove length direction was 12 mm, the length of the inclined portion 16Ba as measured in the groove length direction was 12 mm, and an angle of inclination θa of the inclined portion 16Ba was 5° (the measurement reference was the same as that of the angle of inclination θ1).

Example 4

Similarly to in Example 3, the parallel portion 16Bb and the inclined portion 16Ba were provided at the groove bottom 16B of the lug groove 16. Note that the groove bottom 16B was inclined 3° (the average angle of inclination θ1) from the ⅓ point toward the ground contact edge. In Example 4, the length of the parallel portion 16Bb as measured in the groove length direction was 18 mm, the length of the inclined portion 16Ba as measured in the groove length direction was 6 mm, and the angle of inclination θa of the inclined portion 16Ba was 3° (the measurement reference was the same as that of the angle of inclination θ1).

Example 5

The tire of Example 3 where raised-bottom portions were provided at the sipes.

Hydroplaning Performance (Straight Line)

Test tires with a tire size of 195/65R15 were each assembled onto an applicable rim, inflated to an internal pressure of 200 kPa, and mounted to a right front wheel of a passenger vehicle. The right side of the vehicle was set on a road surface covered with depth of 10 mm of water. The vehicle was accelerated, and the speed at which the tires skidded was taken as the speed at which hydroplaning occurred.

The evaluation is expressed using relative values in an index where the speed at which hydroplaning occurs in the tire according to the conventional example was set to 100. The larger the numerical value, the higher the speed at which hydroplaning occurred and the better the hydroplaning performance.

Dry Road Surface Braking Performance

The tires with a tire size of 195/65R15 were each assembled onto an applicable rim, and braking distance was calculated using deceleration (G) until coming to a stop after applying the brakes at 100 km/h.

The evaluation is expressed using an inverse index, with the braking distance of the conventional example set to 100. The larger the numerical value, the shorter the braking distance and the better the braking performance.

Anti-Wear Characteristics

The tires with a tire size of 195/65R15 were each assembled onto an applicable rim, inflated to the specified internal pressure for the vehicle to which they were mounted (200 kPa), and loaded to the specified standard load (4.3 kN). The wear life of each tire was estimated from the wear amount after running for 5000 km on a drum testing machine. Note that the wear life is considered to be the time when any of the main grooves on the tire is completely worn away.

The evaluation is expressed using an index, with the wear life of the tire of the conventional example set to 100. The larger the numerical value, the better the anti-wear characteristics.

TABLE 1

|  | Conventional Example | Example 1 | Example 2 | Comparative Example | Example 3 | Example 4 | Example 5 |
|---|---|---|---|---|---|---|---|
| Hydroplaning Performance (Straight Line) | 100 | 103 | 104 | 103 | 104 | 102 | 104 |
| Braking Performance (Dry Road Surface) | 100 | 107 | 103 | 98 | 109 | 104 | 113 |
| Anti-Wear Characteristics | 100 | 113 | 105 | 96 | 116 | 107 | 123 |

As illustrated in Table 1, the tires of Examples 1 to 5 applied with the present invention exhibited excellent hydroplaning performance, braking performance, and anti-wear characteristics.

The disclosure of Japanese Patent Application No. 2015-120368, filed on Jun. 15, 2015 is incorporated in its entirety by reference herein.

All cited documents, patent applications, and technical standards mentioned in the present specification are incorporated by reference in the present specification to the same extent as if the individual cited document, patent application, or technical standard was specifically and individually indicated to be incorporated by reference.

The invention claimed is:

1. A pneumatic tire, comprising:
a tread that contacts a road surface;
a plurality of lug grooves that are provided at the tread, that extend from a tire width direction center side of the tread toward a ground contact edge of the tread, and that partition a land portion; and
a plurality of shoulder-side circumferential direction grooves, each of which couples together one of the plurality of lug grooves and another of the plurality of lug grooves, which are adjacent to each other in a tire circumferential direction,
wherein, when viewing a cross-section of each of the lug grooves along a groove length direction, in a state in which the tire is mounted to an applicable rim and inflated to a maximum air pressure corresponding to a tire standard maximum load capacity, while applied with a load of 100% of the maximum load capacity in a state in which a tire rotation axis is, with respect to a horizontal and flat road surface, parallel to the road surface:
each of the lug grooves includes a groove bottom formed at an incline with respect to a tread face of the tread contacting the road surface, such that a groove depth at a ground contact edge side of the lug grooves becomes shallower in depth on progression from a tire equatorial plane side toward the ground contact edge; and
an average angle of inclination θ1 formed between the tread face and the groove bottom of the lug grooves from an intersection point P1 to an intersection point P3 is set to be no more than 5°, P1 being an intersection point between the groove bottom of the lug grooves and an imaginary line passing through the ground contact edge and extending in a direction at a right angle to the tread face, P3 being an intersection point between the groove bottom of the lug grooves and an imaginary line passing through a ⅓ point P2 on the tread face and extending in a direction at a right angle to the tread face, and P2 being ⅓ of the distance of a tread half-width from the ground contact edge toward the tire equatorial plane side,
wherein a ratio b/c is 0.07 or more and 0.60 or less, wherein b is a cross-sectional area of a connecting portion between one tire circumferential direction side end portion of one of the plurality of shoulder-side circumferential direction grooves and one of the plurality of lug grooves, and c is a cross-sectional area of the one of the plurality of lug grooves at the ground contact edge, and
wherein the tread is formed with different kinds of shoulder-side blocks in a circumferential direction dimension, and a radius of curvature Ra on a tread-in side and a radius of curvature Rb on a kick-off side of the lug grooves partitioning the shoulder-side blocks having a short circumferential direction dimension are larger than a radius of curvature Ra on the tread-in side and a radius of curvature Rb on the kick-off side of the lug grooves partitioning the shoulder-side blocks having a long circumferential direction dimension.

2. The pneumatic tire of claim 1, wherein:
the land portion partitioned by the plurality of lug grooves is further partitioned into a plurality of blocks in a tire width direction by a plurality of circumferential direction grooves extending in a direction intersecting the lug grooves;
a plurality of sipes are formed at blocks among the plurality of blocks that include the ground contact edge; and
at least half of the plurality of sipes are provided with a second raised-bottom portion having a height of from 2 mm to 5 mm within a range spanning from a tire width direction inner side end of the blocks to a position 40% of the distance from the tire width direction inner side end toward the ground contact edge of the block.

3. The pneumatic tire of claim 1, wherein:
a flat portion, having a constant groove depth from the ground contact edge toward a tire width direction inner side, is provided at the groove bottoms,
a plurality of sipes are formed in the land portion including the ground contact edge, the plurality of sipes being formed so as to extend from a tire width direction inner side end of the land portion toward a tire width direction outer side and to traverse the ground contact edge, and
at least half of the plurality of sipes are provided with a first raised-bottom portion having a height of from 2 mm to 4 mm within a range from the ground contact edge to 20 mm toward the tire width direction inner side.

4. The pneumatic tire of claim 1, wherein:
a flat portion, having a constant groove depth from the ground contact edge toward a tire width direction inner side, is provided at the groove bottoms, the land portion partitioned by the plurality of lug grooves is further partitioned into a plurality of blocks in a tire width direction by a plurality of circumferential direction grooves extending in a direction intersecting the lug grooves, a plurality of sipes are formed at blocks among the plurality of blocks that include the ground contact edge, and at least half of the plurality of sipes are provided with a second raised-bottom portion having a height of from 2 mm to 5 mm within a range spanning from a tire width direction inner side end of the blocks to a position 40% of the distance from the tire width direction inner side end toward the ground contact edge of the block.

5. The pneumatic tire of claim 1, wherein:

a plurality of sipes are formed in the land portion including the ground contact edge, the plurality of sipes being formed so as to extend from a tire width direction inner side end of the land portion toward a tire width direction outer side and to traverse the ground contact edge, at least half of the plurality of sipes are provided with a first raised-bottom portion having a height of from 2 mm to 4 mm within a range from the ground contact edge to 20 mm toward the tire width direction inner side, the land portion partitioned by the plurality of lug grooves is further partitioned into a plurality of blocks in a tire width direction by a plurality of circumferential direction grooves extending in a direction intersecting the lug grooves, a plurality of sipes are formed at blocks among the plurality of blocks that include the ground contact edge, and at least half of the plurality of sipes are provided with a second raised-bottom portion having a height of from 2 mm to 5 mm within a range spanning from a tire width direction inner side end of the blocks to a position 40% of the distance from the tire width direction inner side end toward the ground contact edge of the block.

6. The pneumatic tire of claim 1, wherein:

a flat portion, having a constant groove depth from the ground contact edge toward a tire width direction inner side, is provided at the groove bottoms, a plurality of sipes are formed in the land portion including the ground contact edge, the plurality of sipes being formed so as to extend from a tire width direction inner side end of the land portion toward a tire width direction outer side and to traverse the ground contact edge, at least half of the plurality of sipes are provided with a first raised-bottom portion having a height of from 2 mm to 4 mm within a range from the ground contact edge to 20 mm toward the tire width direction inner side, the land portion partitioned by the plurality of lug grooves is further partitioned into a plurality of blocks in a tire width direction by a plurality of circumferential direction grooves extending in a direction intersecting the lug grooves, a plurality of sipes are formed at blocks among the plurality of blocks that include the ground contact edge, and at least half of the plurality of sipes are provided with a second raised-bottom portion having a height of from 2 mm to 5 mm within a range spanning from a tire width direction inner side end of the blocks to a position 40% of the distance from the tire width direction inner side end toward the ground contact edge of the block.

7. The pneumatic tire of claim 1, wherein a cross-sectional area a is from 0 $mm^2$ to 18 $mm^2$, the cross-sectional area b is from 8 $mm^2$ to 46 $mm^2$, and the cross-sectional area c is from 77 $mm^2$ to 110 $mm^2$, wherein a is a cross-sectional area at a connection portion of the lug groove to a center circumferential direction groove.

8. The pneumatic tire of claim 1, wherein an average of the groove depth between the intersection point P1 and the intersection point P3 of the groove bottom of the lug groove is no less than 90% of a groove depth D0 of an end portion of the lug groove on the tire equatorial plane side.

9. The pneumatic tire of claim 1, wherein a groove area of the lug grooves is greater than that of the shoulder-side circumferential direction grooves.

10. A pneumatic tire, comprising:

a tread that contacts a road surface;

a plurality of lug grooves that are provided at the tread, that extend from a tire width direction center side of the tread toward a ground contact edge of the tread, and that partition a land portion; and a plurality of shoulder-side circumferential direction grooves, each of which couples together one of the plurality of lug grooves and another of the plurality of lug grooves, which are adjacent to each other in a tire circumferential direction, wherein, when viewing a cross-section of each of the lug grooves along a groove length direction, in a state in which the tire is mounted to an applicable rim and inflated to a maximum air pressure corresponding to a tire standard maximum load capacity while in a non-loaded state:

each of the lug grooves has a groove bottom formed at an incline with respect to a tread face of the tread, such that a groove depth at a ground contact edge side of the lug grooves becomes shallower in depth on progression from a tire equatorial plane side toward the ground contact edge; and an average angle of inclination θ2 formed between the tread face between the ground contact edge and a ⅓ point P2, and the groove bottom between an intersection point P1 and an intersection point P3, is set to be no more than 5°, P1 being an intersection point between the groove bottom of the lug grooves and an imaginary line passing through the ground contact edge and extending in a direction at a right angle to the tread face, P3 being an intersection point between the groove bottom of the lug grooves and an imaginary line passing through the ⅓ point P2 on the tread face and extending in a direction at a right angle to the tread face, and P2 being ⅓ of the distance of a tread half-width from the ground contact edge toward a tire equatorial plane side, wherein a ratio b/c is 0.07 or more and 0.60 or less, wherein b is a cross-sectional area of a connecting portion between one tire circumferential direction side end portion of one of the plurality of shoulder-side circumferential direction grooves and one of the plurality of lug grooves, and c is a cross-sectional area of the one of the plurality of lug grooves at the ground contact edge, and wherein the tread is formed with different kinds of shoulder-side blocks in a circumferential direction dimension, and a radius of curvature Ra on a tread-in side and a radius of curvature Rb on a kick-off side of the lug grooves partitioning the shoulder-side blocks having a short circumferential direction dimension are larger than a radius of curvature Ra on the tread-in side and a radius of curvature Rb on the kick-off side of the lug grooves partitioning the shoulder-side blocks having a long circumferential direction dimension.

11. The pneumatic tire of claim 10, wherein:
the land portion partitioned by the plurality of lug grooves is further partitioned into a plurality of blocks in a tire width direction by a plurality of circumferential direction grooves extending in a direction intersecting the lug grooves,
a plurality of sipes are formed at blocks among the plurality of blocks that include the ground contact edge, and
at least half of the plurality of sipes are provided with a second raised-bottom portion having a height of from 2 mm to 5 mm within a range spanning from a tire width direction inner side end of the blocks to a position 40% of the distance from the tire width direction inner side end toward the ground contact edge of the block.

12. The pneumatic tire of claim 10, wherein:
a flat portion, having a constant groove depth from the ground contact edge toward a tire width direction inner side, is provided at the groove bottoms,
a plurality of sipes are formed in the land portion including the ground contact edge, the plurality of sipes being formed so as to extend from a tire width direction inner side end of the land portion toward a tire width direction outer side and to traverse the ground contact edge, and
at least half of the plurality of sipes are provided with a first raised-bottom portion having a height of from 2 mm to 4 mm within a range from the ground contact edge to 20 mm toward the tire width direction inner side.

13. The pneumatic tire of claim 10, wherein:
a flat portion, having a constant groove depth from the ground contact edge toward a tire width direction inner side, is provided at the groove bottoms,
the land portion partitioned by the plurality of lug grooves is further partitioned into a plurality of blocks in a tire width direction by a plurality of circumferential direction grooves extending in a direction intersecting the lug grooves,
a plurality of sipes are formed at blocks among the plurality of blocks that include the ground contact edge, and
at least half of the plurality of sipes are provided with a second raised-bottom portion having a height of from 2 mm to 5 mm within a range spanning from a tire width direction inner side end of the blocks to a position 40% of the distance from the tire width direction inner side end toward the ground contact edge of the block.

14. The pneumatic tire of claim 10, wherein:
a plurality of sipes are formed in the land portion including the ground contact edge, the plurality of sipes being formed so as to extend from a tire width direction inner side end of the land portion toward a tire width direction outer side and to traverse the ground contact edge,
at least half of the plurality of sipes are provided with a first raised-bottom portion having a height of from 2 mm to 4 mm within a range from the ground contact edge to 20 mm toward the tire width direction inner side,
the land portion partitioned by the plurality of lug grooves is further partitioned into a plurality of blocks in a tire width direction by a plurality of circumferential direction grooves extending in a direction intersecting the lug grooves,
a plurality of sipes are formed at blocks among the plurality of blocks that include the ground contact edge, and
at least half of the plurality of sipes are provided with a second raised-bottom portion having a height of from 2 mm to 5 mm within a range spanning from a tire width direction inner side end of the blocks to a position 40% of the distance from the tire width direction inner side end toward the ground contact edge of the block.

15. The pneumatic tire of claim 10, wherein:
a flat portion, having a constant groove depth from the ground contact edge toward a tire width direction inner side, is provided at the groove bottoms,
a plurality of sipes are formed in the land portion including the ground contact edge, the plurality of sipes being formed so as to extend from a tire width direction inner side end of the land portion toward a tire width direction outer side and to traverse the ground contact edge,
at least half of the plurality of sipes are provided with a first raised-bottom portion having a height of from 2 mm to 4 mm within a range from the ground contact edge to 20 mm toward the tire width direction inner side,
the land portion partitioned by the plurality of lug grooves is further partitioned into a plurality of blocks in a tire width direction by a plurality of circumferential direction grooves extending in a direction intersecting the lug grooves,
a plurality of sipes are formed at blocks among the plurality of blocks that include the ground contact edge, and
at least half of the plurality of sipes are provided with a second raised-bottom portion having a height of from 2 mm to 5 mm within a range spanning from a tire width direction inner side end of the blocks to a position 40% of the distance from the tire width direction inner side end toward the ground contact edge of the block.

16. The pneumatic tire of claim 10, wherein a cross-sectional area a is from 0 $mm^2$ to 18 $mm^2$, the cross-sectional area b is from 8 $mm^2$ to 46 $mm^2$, and the cross-sectional area c is from 77 $mm^2$ to 110 $mm^2$, wherein a is a cross-sectional area at a connection portion of the lug groove to a center circumferential direction groove.

17. The pneumatic tire of claim 10, wherein an average of the groove depth between the intersection point P1 and the intersection point P3 of the groove bottom of the lug groove is no less than 90% of a groove depth D0 of an end portion of the lug groove on the tire equatorial plane side.

18. The pneumatic tire of claim 10, wherein a groove area of the lug grooves is greater than that of the shoulder-side circumferential direction grooves.

* * * * *